(12) United States Patent
Tsuruoka

(10) Patent No.: US 8,154,630 B2
(45) Date of Patent: Apr. 10, 2012

(54) IMAGE PROCESSING APPARATUS, IMAGE PROCESSING METHOD, AND COMPUTER READABLE STORAGE MEDIUM WHICH STORES IMAGE PROCESSING PROGRAM

(75) Inventor: Takao Tsuruoka, Machida (JP)

(73) Assignee: Olympus Corporation (JP)

( * ) Notice: Subject to any disclaimer, the term of this patent is extended or adjusted under 35 U.S.C. 154(b) by 300 days.

(21) Appl. No.: 12/576,677

(22) Filed: Oct. 9, 2009

(65) Prior Publication Data
US 2010/0026859 A1 Feb. 4, 2010

Related U.S. Application Data

(63) Continuation of application No. PCT/JP2008/056510, filed on Mar. 26, 2008.

(30) Foreign Application Priority Data

Apr. 13, 2007 (JP) ................................. 2007-105925

(51) Int. Cl.
*H04N 5/217* (2006.01)
*H04N 9/64* (2006.01)
*G06K 9/40* (2006.01)
*G06K 9/38* (2006.01)

(52) U.S. Cl. ........ 348/241; 348/243; 348/246; 348/255; 348/248; 382/274; 382/275; 382/261; 382/272

(58) Field of Classification Search .......... 348/241–253, 348/255, 254, 272, 273; 382/260, 254, 270, 382/272, 274, 275, 162, 261
See application file for complete search history.

(56) References Cited

U.S. PATENT DOCUMENTS

| 5,867,228 | A | 2/1999 | Miki et al. | 348/624 |
|---|---|---|---|---|
| 7,031,548 | B2* | 4/2006 | Baggs | 382/261 |
| 7,570,287 | B2* | 8/2009 | Tsuruoka | 348/241 |
| 7,656,442 | B2* | 2/2010 | Tsuruoka | 348/241 |
| 7,812,865 | B2* | 10/2010 | Tsuruoka | 348/241 |
| 7,916,187 | B2* | 3/2011 | Tsuruoka | 348/241 |
| 2007/0040919 | A1 | 2/2007 | Tsuruoka | 348/241 |

FOREIGN PATENT DOCUMENTS

| JP | 63-286074 | 11/1988 |
|---|---|---|
| JP | 6-178166 | 6/1994 |

(Continued)

OTHER PUBLICATIONS

International Search Report and Written Opinion mailed May 13, 2008 in corresponding PCT International Application No. PCT/JP2008/056510.

*Primary Examiner* — Lin Ye
*Assistant Examiner* — Marly Camargo
(74) *Attorney, Agent, or Firm* — Ostrolenk Faber LLP

(57) ABSTRACT

An image processing apparatus includes a noise reduction unit which performs noise reduction processing to image signals, a first noise presumption unit which presumes a first noise amount from a present image signal among the image signals, and a second noise presumption unit which presumes a second noise amount based on the first noise amount, the present image signal, and the image signal of the past which underwent the noise reduction processing. The noise reduction unit performs the noise reduction processing to the present image signal based on the second noise amount.

23 Claims, 30 Drawing Sheets

FOREIGN PATENT DOCUMENTS

| | | |
|---|---|---|
| JP | 8-149343 | 6/1996 |
| JP | 10-013734 | 1/1998 |
| JP | 2000-209507 | 7/2000 |
| JP | 2001-061081 | 3/2001 |
| JP | 2004-328206 | 11/2004 |
| JP | 2006-023959 | 1/2006 |
| WO | WO 2005/104537 | 11/2005 |

\* cited by examiner

BAYER TYPE PRIMARY COLOR FILTER ARRANGEMENT

Fig. 2A

SEPARATION INTO R, Gr, Gb, AND B COLOR SIGNALS

Fig. 2B

RELATION OF THE NOISE AMOUNT TO THE SIGNAL LEVEL

SIMPLIFICATION OF THE NOISE MODEL

CALCULATION METHOD OF NOISE AMOUNT FROM THE SIMPLIFIED NOISE MODEL

IMAGE SIGNAL $C^{T-1}$ AT TIME T-1

IMAGE SIGNAL $C^T$ AT TIME T

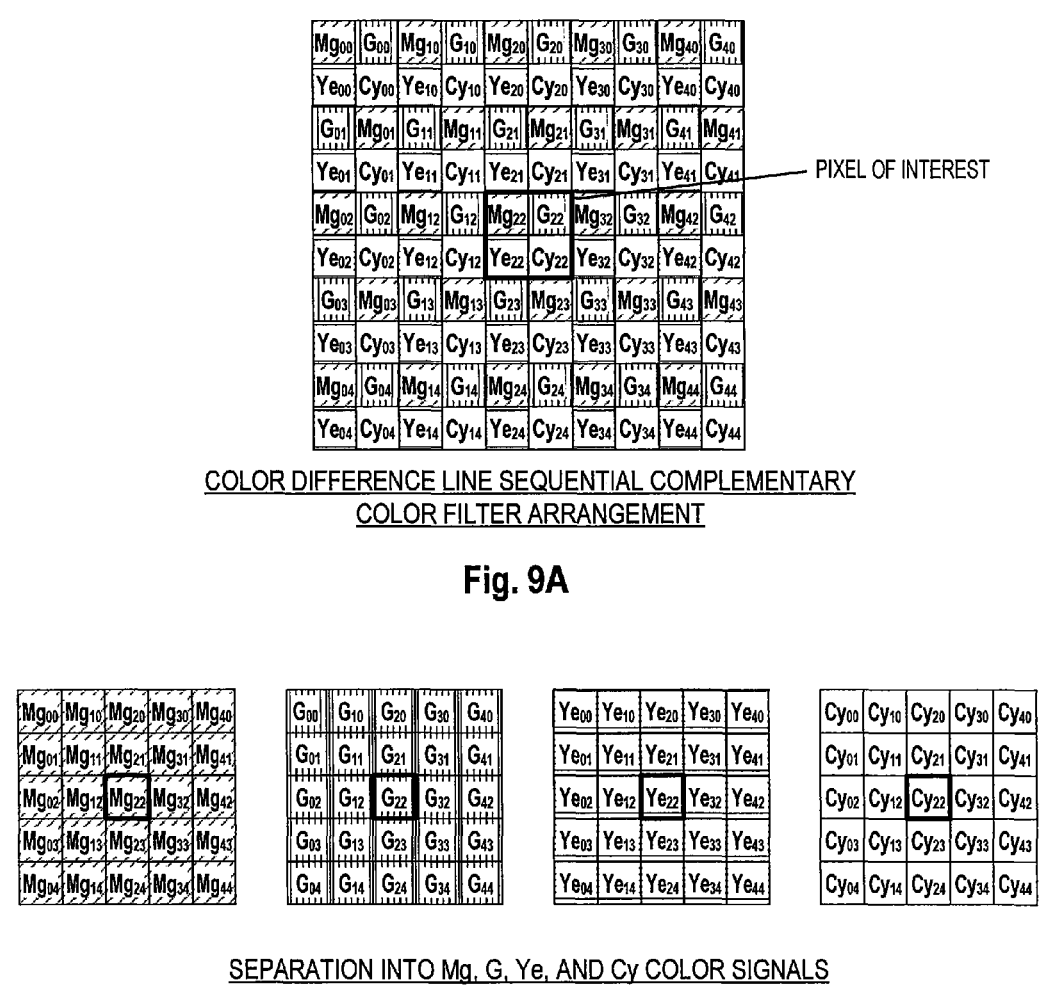

COLOR DIFFERENCE LINE SEQUENTIAL COMPLEMENTARY
COLOR FILTER ARRANGEMENT

Fig. 9A

SEPARATION INTO Mg, G, Ye, AND Cy COLOR SIGNALS

Fig. 9B

COLOR DIFFERENCE LINE SEQUENTIAL
COMPLEMENTARY COLOR FILTER ARRANGEMENT

EVEN NUMBER FIELD SIGNAL

ODD NUMBER FIELD SIGNAL

| 0 | 0 | 2 | 0 | 0 |
|---|---|---|---|---|
| 0 | 7 | 15 | 7 | 0 |
| 2 | 15 | 32 | 15 | 2 |
| 0 | 7 | 15 | 7 | 0 |
| 0 | 0 | 2 | 0 | 0 |

Type 1

| 0 | 1 | 2 | 1 | 0 |
|---|---|---|---|---|
| 1 | 7 | 14 | 7 | 1 |
| 2 | 14 | 28 | 14 | 2 |
| 1 | 7 | 14 | 7 | 1 |
| 0 | 1 | 2 | 1 | 0 |

Type 2

| 1 | 1 | 2 | 1 | 1 |
|---|---|---|---|---|
| 1 | 8 | 13 | 8 | 1 |
| 2 | 13 | 23 | 13 | 2 |
| 1 | 8 | 13 | 8 | 1 |
| 1 | 1 | 2 | 1 | 1 |

Type 3

| 1 | 2 | 3 | 2 | 1 |
|---|---|---|---|---|
| 2 | 8 | 11 | 8 | 2 |
| 3 | 11 | 20 | 11 | 3 |
| 2 | 8 | 11 | 8 | 2 |
| 1 | 2 | 3 | 2 | 1 |

Type 4

(a) THE PIXEL OF INTEREST IN THE LUMINANCE SIGNAL Y (b) PIXELS FOR THE LUMINANCE SIGNAL Y' AFTER THE NOISE REDUCTION PROCESSING THAT CORRESPOND TO THE PIXEL OF INTEREST (a) THE PIXEL OF INTEREST IN THE COLOR DIFFERENCE SIGNAL Cr (b) PIXELS OF THE COLOR DIFFERENCE SIGNAL Cr' AFTER THE NOISE REDUCTION PROCESSING THAT CORRESPOND TO THE PIXEL OF INTEREST

IMAGE PROCESSING APPARATUS, IMAGE PROCESSING METHOD, AND COMPUTER READABLE STORAGE MEDIUM WHICH STORES IMAGE PROCESSING PROGRAM

CROSS REFERENCE TO RELATED APPLICATIONS

This application is a continuation of International Patent Application No. PCT/JP2008/056510, filed on Mar. 26, 2008, which claims the benefit of Japanese Patent Application No. JP 2007-105925, filed on Apr. 13, 2007, which are incorporated by reference as if fully set forth.

FIELD OF THE INVENTION

The present invention relates to noise reduction processing for random noise in image signals resulting from imaging systems, and in particular, to cyclic type noise reduction processing.

BACKGROUND OF THE INVENTION

Generally, image signals obtained from an imaging system having imaging devices and their accompanying analog circuits, A/D converters, etc., contain noise components. The noise components can be categorized roughly into fixed pattern noise and random noise. The fixed pattern noise is noise, such as defective pixels, caused mainly by imaging devices. On the other hand, the random noise is generated in imaging devices and analog circuits, and has characteristics close to white noise.

An example of noise reduction processing of random noise in motion pictures is cyclic type noise reduction processing using the correlation characteristics in the direction at the time axis. The cyclic type noise reduction processing uses the characteristics of high correlation of the image signal of the present with the image signals of the past, whereas the correlation of random noise with the image signals of the past is low, and thereby, extracts only the random noise by performing differential processing between the present and the past image signals, and performs noise reduction processing for the present image signal using the extracted random noise.

In this case, there is a problem in that if the differential processing is performed in moving areas where the object of shooting moves, the motion components are also extracted together with the random noise. For this reason, the accuracy in removing the motion component from the signal which underwent the differential processing becomes the cause to affect the accuracy of the cyclic type noise reduction processing.

An example of the method of removing such a motion component is JP10-13734A, which discloses a method for detecting a motion component from the image signal and for controlling a limit value and a feedback coefficient for the signal which underwent the differential processing based on the detected motion component. Thereby, when there are few number of motion components, the noise reduction processing is performed strongly to obtain image signals having low amount of noise, and when there are large number of motion components, the noise reduction processing is performed weakly to obtain image signals having little afterimage.

Moreover, JP2000-209507A discloses a method for controlling a feedback coefficient from the signal value that underwent the differential processing. If the value of the signal which underwent the differential processing is small, it is determined as the random noise, and it is possible to obtain an image signal having small amount of noise by making the feedback coefficient larger. If the value of the signal which underwent the differential processing is large, it is determined as the motion component, and it is possible to obtain image signals having little afterimage by making the feedback coefficient small.

Furthermore, JP2006-23959A discloses an example for controlling noise reduction processing in block unit basis by presuming the amount of noise in block unit basis based on noise models.

SUMMARY OF THE INVENTION

According to an aspect of the present invention, an image processing apparatus which performs noise reduction processing to image signals taken in from an imaging system in time sequence, is provided. The image processing apparatus comprises a noise reduction unit which performs noise reduction processing to image signals, a first noise presumption unit which presumes a first noise amount from a present image signal among the image signals, and a second noise presumption unit which presumes a second noise amount based on the first noise amount, the present image signal, and the image signal of the past which underwent the noise reduction processing. The noise reduction unit performs the noise reduction processing to the present image signal based on the second noise amount.

According to another aspect of the present invention, a computer readable storage medium which stores an image processing program which performs noise reduction processing to an image signal taken in from an imaging system in time sequence, is provided. The program is comprised of the steps of a noise reduction step which performs noise reduction processing to the image signal, a first noise presumption step which presumes a first noise amount from a present image signal among the image signals, and a second noise presumption step which presumes a second noise amount based on the first noise amount, the present image signal, and the image signal of the past which underwent the noise reduction processing. The noise reduction step performs the noise reduction processing to the present image signal based on the second noise amount.

According to yet another aspect of the present invention, an image processing method which performs noise reduction processing to an image signal taken in from an imaging system in time sequence, is provided. The method comprises a noise reduction step which performs noise reduction processing to the image signal, a first noise presumption step which presumes a first noise amount from a present image signal among the image signals, and a second noise presumption step which presumes a second noise amount based on the first noise amount, the present image signal, and the image signal of the past which underwent the noise reduction processing. The noise reduction step performs the noise reduction processing to the present image signal based on the second noise amount.

Embodiments and advantages of this invention will be described in detail below with reference to the attached figures.

BRIEF DESCRIPTION OF THE DRAWINGS

FIGS. 2A and 2B are diagrams of an arrangement and the local area of a Bayer type primary color filter.

FIGS. 9A and 9B are diagrams illustrating an arrangement and the local area of a color difference line sequential complementary color filter.

FIG. 12A shows the flow of the overall processing, FIG. 12B shows the flow of the first noise presumption processing, FIG. 12C shows the flow of the second noise presumption processing, and FIG. 12D shows the flow of the noise reduction processing.

FIG. 23A shows the flow of the overall processing, FIG. 23B shows the flow of the first noise presumption processing, FIG. 23C shows the flow of the second noise presumption processing, and FIG. 23D shows the flow of the noise reduction processing.

DETAILED DESCRIPTION OF THE PREFERRED EMBODIMENT

Hereafter, embodiments of the present invention will be described with reference to the attached drawings.

First, the arrangement of the embodiments will be described.

Figure 1:
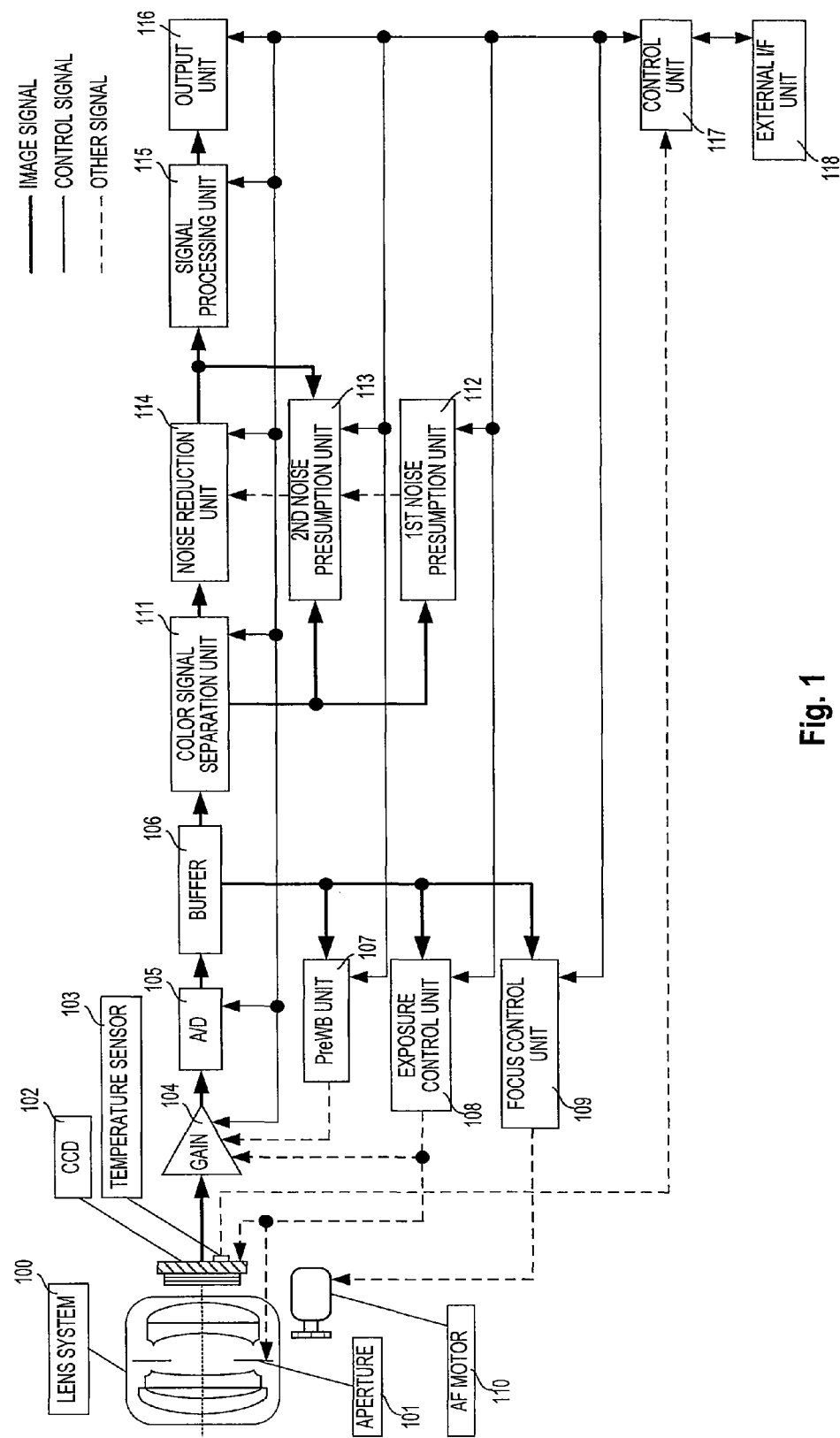
FIG. 1 is a block diagram of the first embodiment.

FIG. 1 is a block diagram of the first embodiment. The image signal which is taken in through a lens system 100, an aperture 101, and a CCD 102 is amplified at an amplifier ("GAIN" in the figure) 104, and is converted to the digital signal at an A/D converter ("A/D" in the figure) 105. The image signal from the A/D converter 105 is transferred to a color signal separation unit 111 through a buffer 106.

The buffer 106 is also connected to a pre-white balance adjustment unit ("PreWB unit" in the figure) 107, an exposure control unit 108, and a focus control unit 109. The pre-white balance adjustment unit 107 is connected to the amplifier 104, the exposure control unit 108 is connected to the aperture 101, and the focus control unit 109 is connected to an AF motor 110.

The color signal separation unit 111 is connected to a first noise presumption unit 112, a second noise presumption unit 113, and a noise reduction unit 114. The first noise presumption unit 112 is connected to the second noise presumption unit 113, and the second noise presumption unit 113 is connected to the noise reduction unit 114. The noise reduction unit 114 is connected to the second noise presumption unit 113 and a signal processing unit 115. The signal processing unit 115 is connected to an output unit 116, such as a memory card.

A control unit 117, such as a microcomputer, is bidirectionally connected to the amplifier 104, the A/D 105, the pre-white balance adjustment unit 107, the exposure control unit 108, the focus control unit 109, the color signal separation unit 111, the first noise presumption unit 112, the second noise presumption unit 113, the noise reduction unit 114, the signal processing unit 115, and the output unit 116.

Moreover, an external interface (I/F) unit 118 having a power switch, a shutter release button, and an interface for performing the setting for switching between various types of shooting modes is also bidirectionally connected to the control unit 117. Furthermore, the signal from a temperature sensor 103 arranged near the CCD 102 is connected to the control unit 117.

Now, the details of the signal processing will be described.

The flow of the image signal will be described with reference to FIG. 1. After setting the shooting conditions, such as ISO sensitivity, by the external I/F unit 118, the shooting mode starts by pushing the shutter release button. The image signal taken in through the lens system 100, the aperture 101, and the CCD 102 is continuously outputted in a predetermined time interval as the analog signal. Henceforth, a plurality of image signals outputted continuously is simply referred to as "image signals" and a single image of the image signals is referred to as a "frame signal". Moreover, in the present embodiment, 1/30 seconds (henceforth referred to as "1 frame time") are assumed as the above predetermined time interval. Furthermore, as for the CCD 102, a single CCD which has arranged a Bayer type primary color filter at its front is assumed.

Figures 2A, 2B:
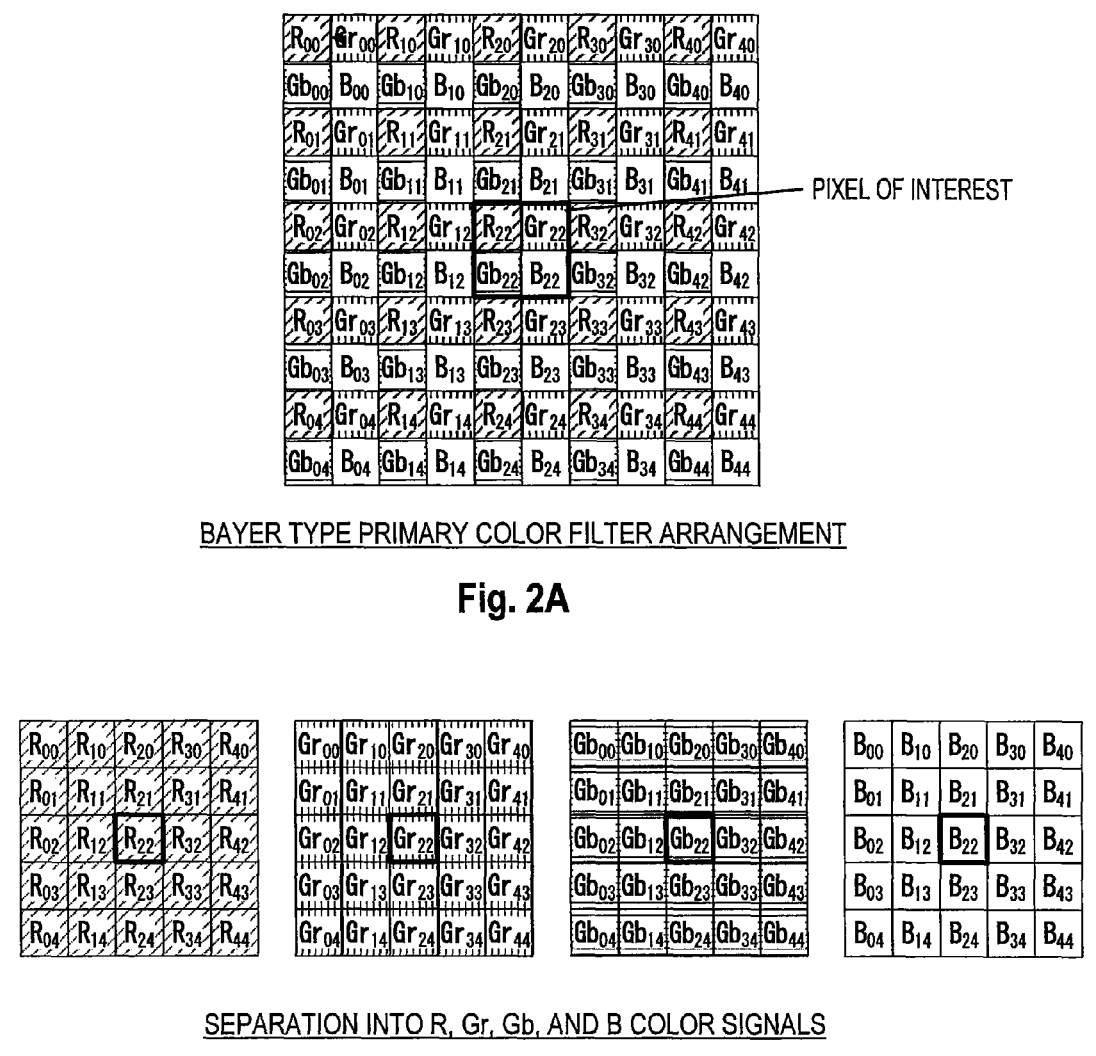

FIG. 2A shows an arrangement of a Bayer type primary color filter. The Bayer type filter uses 2×2 pixels as the base unit where 1 red (R) filter, 1 blue (B) filter, and two green (Gr, Gb) filters are arranged. Although Gr and Gb green filters have same characteristics, they are distinguished for the purposes of describing the processing in this embodiment. The analog signal is amplified by the amplifier 104 for a predetermined amount, is converted at the A/D converter 105 into a digital signal, and is transferred to the buffer 106.

The buffer 106 can record the signal for 1 frame and is overwritten upon the shootings. The frame signal in the buffer 106 is intermittently transferred to the pre-white balance adjustment unit 107, the exposure control unit 108, and the focus control unit 109 by a predetermined frame time interval based on the control of the control unit 117.

In the pre-white balance adjustment unit 107, a simple white balance coefficient is calculated by integrating the signal of a predetermined level for each color signal corresponding to a color filter. The above simple white balance coefficient is transferred to the amplifier 104, and the white balance is adjusted by multiplying by different gains for each color signal.

At the exposure control unit 108, the aperture 101, the electronic shutter speed of CCD 102, the amplification factor of amplifier 104, etc., are controlled so as to obtain a suitable exposure by taking into account the set ISO sensitivity, shutter speed of the limit of image stability, etc. Moreover, at the focus control unit 109, the edge intensity in the image signal is detected and a focusing signal is obtained by controlling the AF motor 110 so that the edge intensity becomes the maximum.

The white balance coefficient obtained in the pre-white balance adjustment unit 107, the exposure information obtained in the exposure control unit 108, and the focus information obtained by the focus control unit 109 are transferred to the control unit 117.

On the other hand, the color signal separation unit 111 sequentially extracts a pixel of interest subjected to the noise reduction processing and a local area consisting of the pixel of interest and proximate pixels located near the pixel of interest for each color signal based on the control of the control unit 117.

In the present embodiment, for example, the color signal separation unit 111 extracts them from a frame signal by using 10×10 pixels shown in FIG. 2A as the base unit. In this example, the pixel of interest subjected to perform the noise reduction processing is the 4 pixels, that is, $R_{22}$, $Gr_{22}$, $Gb_{22}$, and $B_{22}$.

Next, as shown in FIG. 2B, the color signal separation unit 111 separates into 5×5 pixels local area for each color filter of R, Gr, Gb, and B. Henceforth, the pixel value in the local area at time T is indicated $C^T_{ij}$ (wherein C is a color signal C=R, Gr, Gb, and B, i is an X coordinate and i=0-4, and j is a Y coordinate and j=0-4). In a case where the local area is 5×5 pixels, the value of the pixel of interest becomes $C^T_{22}$.

The above-described local area is transferred to the first noise presumption unit 112, and the above-described pixel of interest is transferred to the second noise presumption unit 113 and the noise reduction unit 114. Based on the control of the control unit 117, the first noise presumption unit 112 presumes the first noise amount $C\_N1^T_{22}$ for the value of the pixel of interest $C^T_{22}$, and transfers the presumed amount to the second noise presumption unit 113.

Based on the control of the control unit 117, the second noise presumption unit 113 obtains a differential signal between the value of the pixel of interest $C^T_{22}$ from the color signal separation unit 111 and the value of the pixel of interest of the past which underwent the noise reduction processing from the noise reduction unit 114, and corrects the differential signal by using the first noise amount $C\_N1^T_{22}$ from the first noise presumption unit 112, and thereby, presuming the second noise amount $C\_N2^T_{22}$ and transferring to the noise reduction unit 114

In the present embodiment, the frame signal at the time T−1 before 1 frame time is used for the value of the pixel of interest of the past, and the pixel value which underwent the noise reduction processing is indicated as C'. The value of the pixel of interest of the past which underwent the noise reduction processing for the value of the pixel of interest $C^T_{22}$ becomes $C'^{T-1}_{22}$.

Based on the control of the control unit 117, the noise reduction unit 114 obtains the difference of the second noise amount $C\_N2^T_{22}$ from the second noise presumption unit 113 with respect to the value of the pixel of interest $C^T_{22}$ from the color signal separation unit 111, and thereby, calculates the value of the pixel of interest $C'^T_{22}$ which underwent the noise reduction processing, and transfers the value of the pixel of interest $C'^T_{22}$ to the second noise presumption unit 113 and the signal processing unit 115. It is noted that the noise reduction unit 114 may calculate the value of the pixel of interest $C'^T_{22}$ which underwent the noise reduction processing by performing coring processing using the second noise amount $C\_N2^T_{22}$ with respect to the value of the pixel of interest $C^T_{22}$ as in the noise reduction unit 604 according to the second embodiment, which will be described later.

Processing in the above-described color signal separation unit 111, the first noise presumption unit 112, the second noise presumption unit 113, and the noise reduction unit 114 is performed by synchronizing at local area basis based on the control of the control unit 117.

The signal processing unit 115 performs known interpolation processing, emphasis processing, tone processing, compression processing, etc., to the frame signal which underwent the noise reduction processing based on the control of the control unit 117, and transfers them to the output unit 116. The output unit 116 records and saves the image signal into recording media, such as magnetic disks and memory cards.

Figure 3:
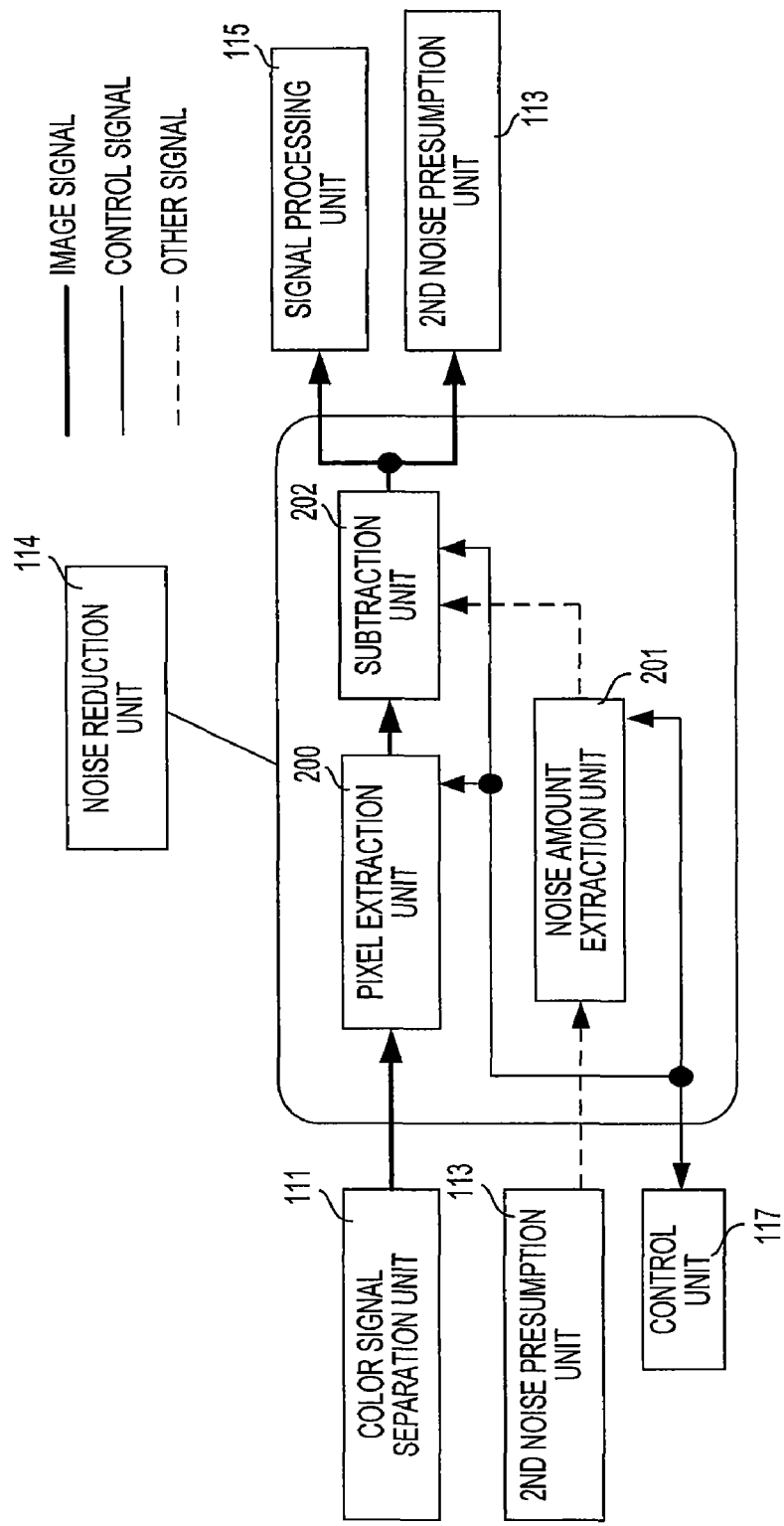
FIG. 3 is a block diagram of a noise reduction unit.

FIG. 3 shows an example of an arrangement of the noise reduction unit 114. The noise reduction unit 114 consists of a pixel extraction unit 200, a noise amount extraction unit 201, and a subtraction unit 202.

The color signal separation unit 111 is connected to the pixel extraction unit 200, and the second noise presumption unit 113 is connected to the noise amount extraction unit 201. The pixel extraction unit 200 and the noise amount extraction unit 201 are connected to a subtraction unit 202. The subtraction unit 202 is connected to the second noise presumption unit 113 and the signal processing unit 115. The control unit 117 is bidirectionally connected to the pixel extraction unit 200, the noise amount extraction unit 201, and the subtraction unit 202.

Based on the control of the control unit 117, the pixel extraction unit 200 reads the value of the pixel of interest $C^T_{22}$ from the color signal separation unit 111, and transfers it to the subtraction unit 202. Based on the control of the control unit 117, the noise amount extraction unit 201 reads the second noise amount $C\_N2^T_{22}$ from the second noise presumption unit 113, and transfers it to the subtraction unit 202.

Based on the control of the control unit 117, the subtraction unit 202 performs subtraction processing between the value of the pixel of interest $C^T_{22}$ from the pixel extraction unit 200, and the second noise amount $C\_N2^T_{22}$ from the noise amount extraction unit 201 to obtain the value of the pixel of interest $C'^T_{22}$ which underwent the noise reduction processing.

$$C'^T_{22} = C^T_{22} - C\_N2^T_{22} \qquad (1)$$

The value of the pixel of interest $C'^T_{22}$ which underwent the noise reduction processing is transferred to the second noise presumption unit 113 and the signal processing unit 115.

Figure 4:
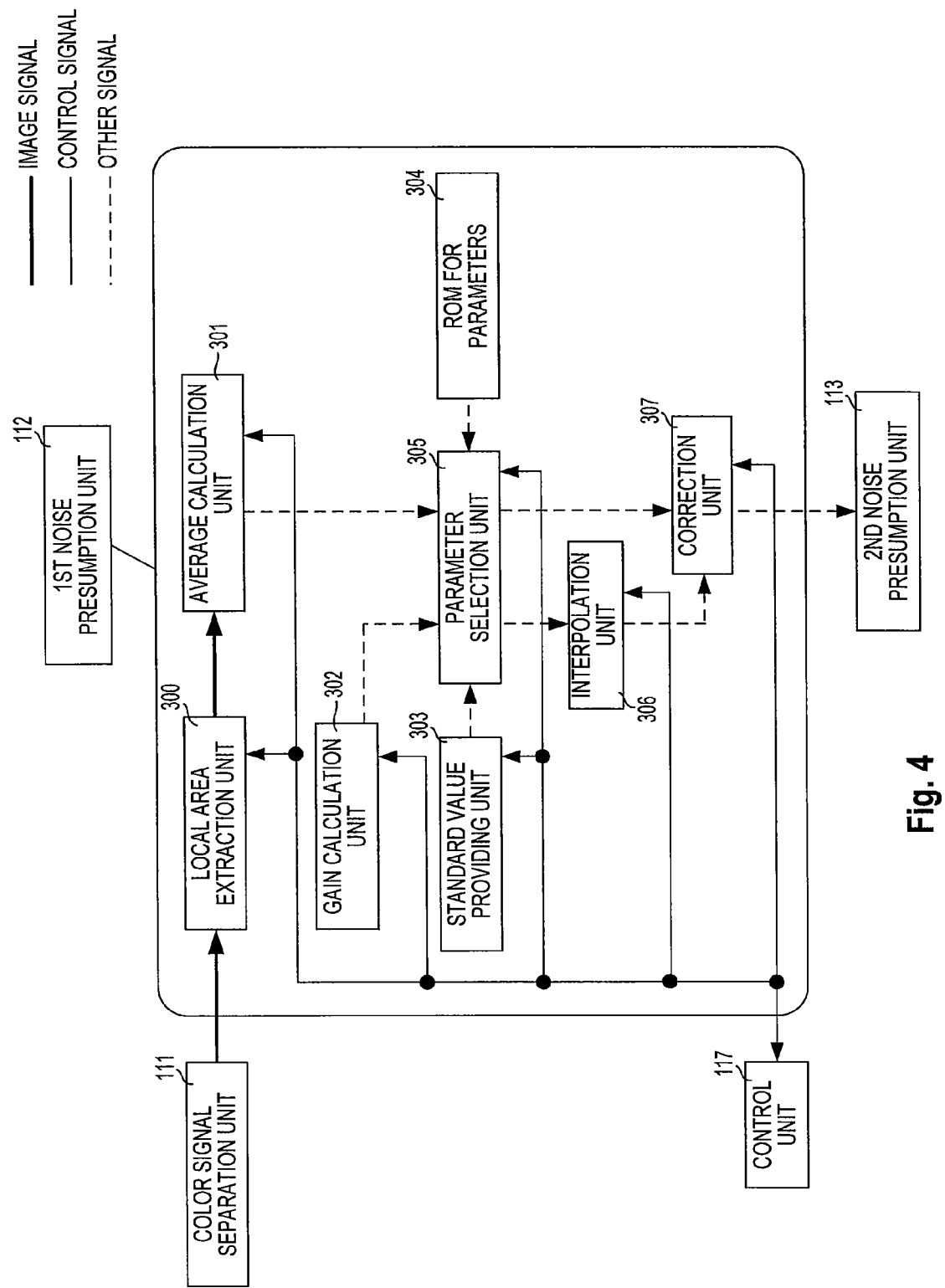
FIG. 4 is a block diagram of a first noise presumption unit.

FIG. 4 shows an example of an arrangement of the first noise presumption unit 112. The first noise presumption unit 112 consists of a local area extraction unit 300, an average calculation unit 301, a gain calculation unit 302, a standard value providing unit 303, a ROM for parameters 304, a parameter selection unit 305, an interpolation unit 306, and a correction unit 307.

The color signal separation unit 111 is connected to the average calculation unit 301 through the local area extraction unit 300. The average calculation unit 301, the gain calculation unit 302, the standard value providing unit 303, and the ROM for parameters 304 are connected to the parameter selection unit 305. The parameter selection unit 305 is connected to the interpolation unit 306 and the correction unit 307. The interpolation unit 306 is connected to the correction unit 307, and the correction unit 307 is connected to the second noise presumption unit 113. The control unit 117 is bidirectionally connected to the local area extraction unit 300, the average calculation unit 301, the gain calculation unit 302, the standard value providing unit 303, the parameter selection unit 305, the interpolation unit 306, and the correction unit 307.

The local area extraction unit 300 sequentially extracts the 5×5 pixel local areas shown in FIG. 2B one by one based on the control of the control unit 117, and transfers them to the average calculation unit 301. The average calculation unit 301 calculates the average C_AV for the local area from the local area extraction unit 300 based on the control of the control unit 117.

$$C\_AV = \frac{\sum_{i,j} C_{ij}^T}{25} \quad (2)$$

The average C_AV shown in Expression (2) is transferred to the parameter selection unit 305.

The gain calculation unit 302 obtains the amount of amplification at the amplifier 104 based on the ISO sensitivity and the exposure information which are transferred from the control unit 117, and transfers it to the parameter selection unit 305. Moreover, the control unit 117 acquires the temperature information on the CCD 102 from the temperature sensor 103, and transfers the information to the parameter selection unit 305.

The parameter selection unit 305 presumes the first noise amount based on the average of the local area from the average calculation unit 301, the information on the gain from the gain calculation unit 302, and the temperature information from the control unit 117.

Figure 5A:
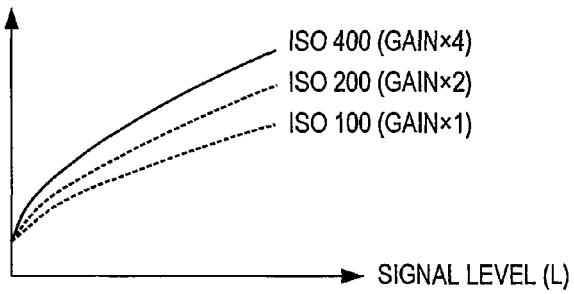
FIGS. 5A-5C are diagrams illustrating the presumption of a first noise amount.
Figure 5B:
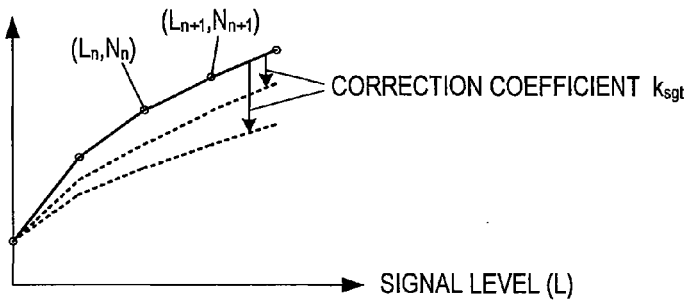

FIGS. 5A and 5B are diagrams illustrating the presumption of the first noise amount. FIG. 5A plots noise amount N to signal level L, and is increasing in secondary curve to the signal level. Expression (3) is obtained by modeling FIG. 5A with a secondary function.

$$N = \alpha L^2 + \beta L + \gamma \quad (3)$$

Here, α, β, and γ are constant terms. However, the noise amount changes not only with the signal level but with the temperature and the gain of the imaging device. FIG. 5A plots the noise amount for three types of ISO sensitivities 100, 200, and 400 which relate to the gain at a certain temperature, as an example. Although the individual curves are in the form shown in Expression (3), their coefficients differ with the ISO sensitivities which relate to the gain. If a model is formulized by assuming the temperature as t, and the gain as g, and considering the above, we obtain:

$$N = \alpha_{gt} L^2 + \beta_{gt} L + \gamma_{gt} \quad (4)$$

Here, $\alpha_{gt}$, $\beta_{gt}$, and $\gamma_{gt}$ are constant terms.

However, it is complicated in terms of processing to record the function of the Expression (4) multiple times, and to calculate the noise amount by the computation each time. For this reason, the model as shown in FIG. 5B is simplified. In FIG. 5B, the model which gives the maximum noise amount is selected as a reference noise model, and this is approximated by the polygonal line of a predetermined number. The points of inflection of the polygonal line are expressed with the coordinate data $(L_n, N_n)$ consisted of the signal level L and the noise amount N. Here, n shows the number of the points of inflection.

Moreover, the correction coefficient $k_{gt}$ for deriving other noise models from the above-described reference noise model is also prepared. The correction coefficient $k_{gt}$ is calculated by the least square method from between each noise model and the reference noise model. In order to derive other noise models from the reference noise model, it is carried out by multiplying the above-described correction coefficient $k_{gt}$.

Figure 5C:
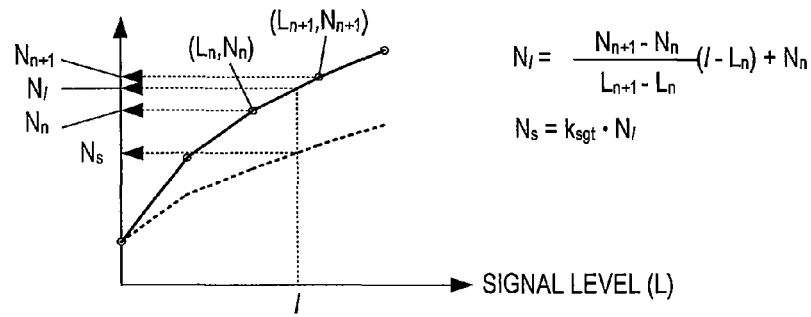

FIG. 5C shows a method to calculate the noise amount from the simplified noise model shown in FIG. 5B. For example, we assume a situation where the noise amount N corresponding to a given signal level l, gain g, and the temperature t is obtained. First, the search for which segment in the reference noise model the signal level l belongs is done. Here, we suppose that it belongs to the segment between $(L_n, N_n)$, and $(L_{n+1}, N_{n+1})$. The amount of the reference noise $N_1$ for the reference noise model is obtained by the linear interpolation.

$$N_l = \frac{N_{n+1} - N_n}{L_{n+1} - L_n}(l - L_n) + N_n \quad (5)$$

Next, the noise amount N is obtained by multiplying the correction coefficient $k_{gt}$.

$$N = k_{gt} \cdot N_l \quad (6)$$

The parameter selection unit 305 sets the signal level l from the average C_AV of the local area from the average calculation unit 301, the gain g from the gain information from the gain calculation unit 302, and the temperature t from the temperature information from the control unit 117.

Next, the coordinate data $(L_n, N_n)$ and $(L_{n+1}, N_{n+1})$ of the segment where the signal level l belongs is searched from the ROM for parameters 304, and this is transferred to the interpolation unit 306. Furthermore, the correction coefficient $k_{gt}$ is searched from the ROM for parameters 304, and this is transferred to the correction unit 307.

Based on the control of the control unit 117, the interpolation unit 306 calculates the amount of reference noise $N_1$ in the reference noise model based on Expression (5) from the signal level l, and the coordinate data $(L_n, N_n)$ and $(L_{n+1}, N_{n+1})$ of the segment from the parameter selection unit 305, and transfers it to the correction unit 307.

Based on the control of the control unit 117, the correction unit 307 calculates the noise amount N based on Expression (6) from the correction coefficient $k_{gt}$ from the parameter selection unit 305 and the amount of reference noise $N_1$ from the interpolation unit 306. The above-described noise amount N is transferred to the second noise presumption unit 113 as the first noise amount $C\_N1^T_{22}$ of the value of the pixel of interest $C^T_{22}$.

It is noted that in the process of the above-described calculation of the noise amount, it is not necessary to obtain information such as temperature t and gain g, for each shooting. The arrangement which records arbitrary information in the standard value providing unit 303 and skips the calculation process is also possible. With such an arrangement, high speed processing, power saving, etc., are achieved. Moreover, although the first noise amount $C\_N1^T_{22}$ is obtained using the noise model herein, the first noise amount $C\_N1^T_{22}$ may be obtained by using a look up table as in the second embodiment which will be described later.

Figure 6:
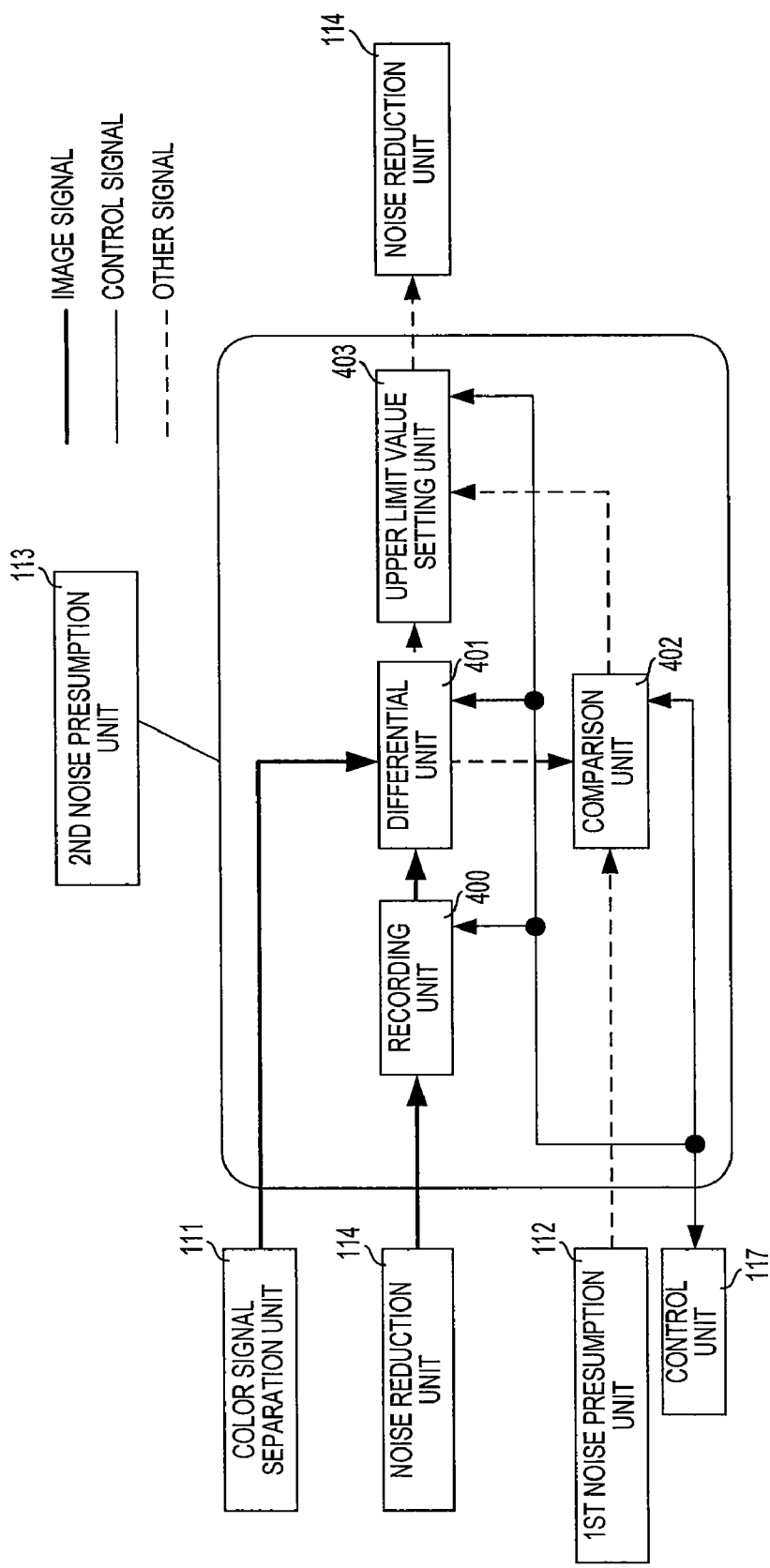
FIG. 6 is a block diagram of a second noise presumption unit.

FIG. 6 shows an example of an arrangement of the second noise presumption unit 113. The second noise presumption unit 113 consists of a recording unit 400, a differential unit 401, a comparison unit 402, and an upper limit value setting unit 403.

The noise reduction unit 114 is connected to the recording unit 400, and the color signal separation unit 111 and the recording unit 400 are connected to the differential unit 401.

The differential unit 401 is connected to the comparison unit 402 and the upper limit value setting unit 403. The first noise presumption unit 112 is connected to the comparison unit 402, and the comparison unit 402 is connected to the upper limit value setting unit 403. The upper limit value setting unit 403 is connected to the noise reduction unit 114. The control unit 117 is bidirectionally connected to the recording unit 400, the differential unit 401, the comparison unit 402, and the upper limit value setting unit 403.

The signal which underwent the noise reduction processing from the noise reduction unit 114 is sequentially transferred to and recorded in the recording unit 400 one by one for each pixel. In the present embodiment, the recording unit 400 can record 1 frame signal, and it is overwritten if the next frame signal which underwent the noise reduction processing has been transferred. In the present embodiment, since the image signal is outputted per 1 frame time, the image signal which underwent the noise reduction processing for 1 frame time earlier is recorded in the recording unit 400.

Based on the control of the control unit 117, the differential unit 401 reads the value of the pixel of interest $C^T_{22}$ from the color signal separation unit 111, and the value of the pixel of interest of the past $C'^{T-1}_{22}$ which underwent the noise reduction processing and corresponds to the value of the pixel of interest $C^T_{22}$ from the recording unit 400 to obtain the differential signal $C\_\Delta^T_{22}$ by performing the differential processing between those values.

$$C\_\Delta^T_{22} = C^T_{22} - C'^{T-1}_{22} \quad (7)$$

The differential signal $C\_\Delta^T_{22}$ shown in Expression (7) is transferred to the comparison unit 402 and the upper limit value setting unit 403. The comparison unit 402 reads the differential signal $C\_\Delta^T_{22}$ from the differential unit 401, and reads the first noise amount $C\_N1^T_{22}$ that corresponds to the value of the pixel of interest $C^T_{22}$ from the first noise presumption unit 112, and compares the both. This comparison determines whether the absolute value of the differential signal $C\_\Delta^T_{22}$ is contained in the first noise amount $C\_N1^T_{22}$ or not, and if it is $C\_\Delta^T_{22} \geq C\_N1^T_{22}$ or $-C_{13} N1^T_{22} \geq C\_\Delta^T_{22}$, it is outside of the noise range, and if it is $C\_N1^T_{22} < C\_\Delta^T_{22} > -C\_N1^T_{22}$, it is inside the noise range. The above determination result is transferred to the upper limit value setting unit 403.

Based on the control of the control unit 117, the upper limit value setting unit 403 obtains the second noise amount $C\_N2^T_{22}$ by performing the correction to the differential signal $C\_\Delta^T_{22}$ from the differential unit 401 based on the comparison result from the comparison unit 402.

$$C\_N2^T_{22} = C\_N1^T_{22} (C\_\Delta^T_{22} \geq C\_N1^T_{22})$$

$$C\_N2^T_{22} = C\_\Delta^T_{22} (C\_N1^T_{22} > C\_\Delta^T_{22} > -C\_N1^T_{22})$$

$$C\_N2^T_{22} = -C\_N1^T_{22} (-C\_N1^T_{22} \geq C\_\Delta^T_{22}) \quad (8)$$

Expression (8) means that a restriction which sets the noise amount as the upper limit is provided when the differential signal exceeds the noise amount (if the differential signal is negative, the differential signal is lower than the noise amount). The above second noise amount $C\_N2^T_{22}$ is transferred to the noise reduction unit 114.

Figure 7A:
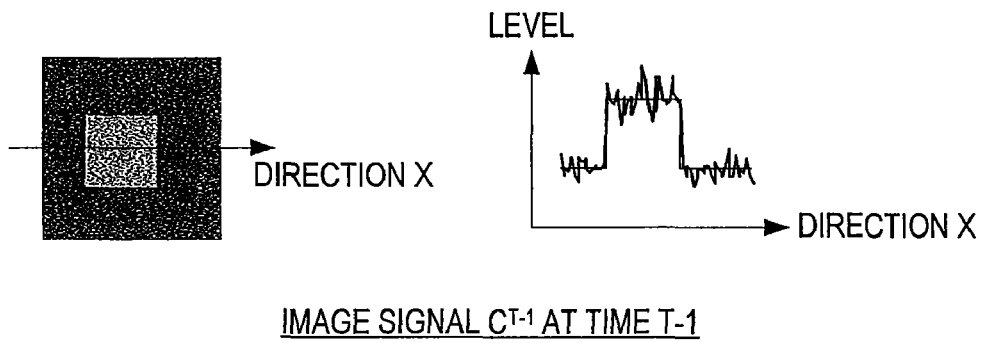
FIGS. 7A and 7B are diagrams illustrating the presumption of the second noise amount, and showing the image signals taken in time sequence and the profiles in the direction of X axis.
Figure 7B:
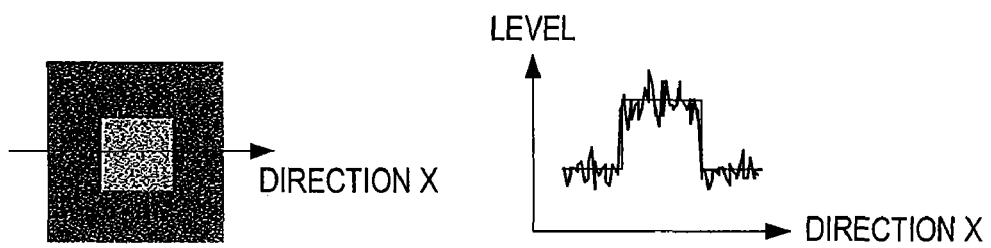
Figure 8:
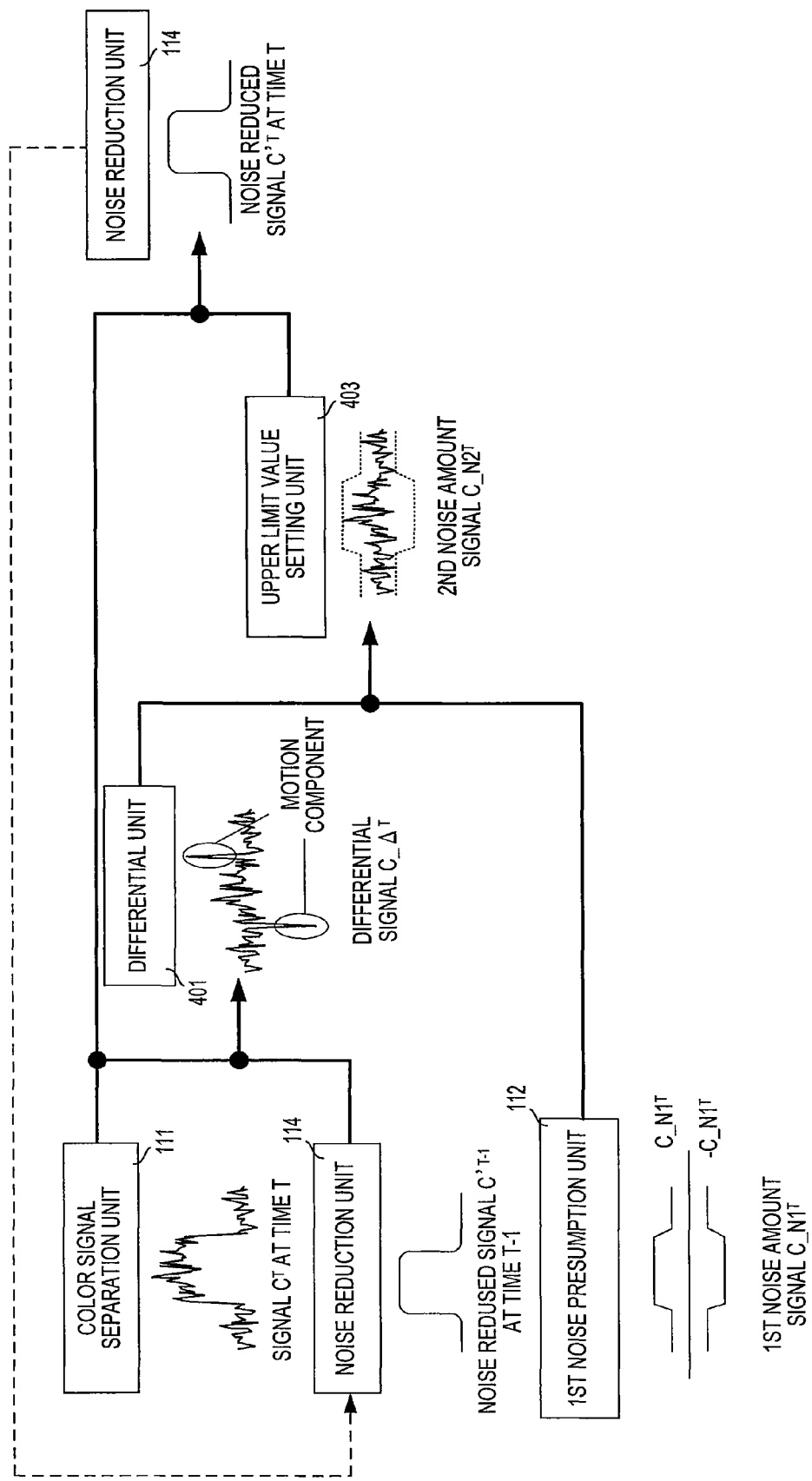
FIG. 8 is a diagram illustrating the presumption of the second noise amount, and showing the signal forms in the processing units.

FIGS. 7A and 7B and FIG. 8 are diagrams illustrating the presumption of the above-described second noise amount. FIGS. 7A and 7B show the image signal taken in time series and the profile in the direction of X axis. As to the object of shooting, we assume a case where a white rectangle moves in the direction of X axis with black as the background. FIG. 7B shows the image signal $C^T$ at the present time T, and FIG. 7A shows the image signal $C^{T-1}$ at the time T-1 before 1 frame time. It is noted that the noise reduction processing is completed for the image signal of FIG. 7A so that there is the image signal $C'^{T-1}$ that underwent the noise reduction processing.

FIG. 8 illustrates the processing in the color signal separation unit 111, the first noise presumption unit 112, the differential unit 401 and the upper limit value setting unit 403 in the second noise presumption unit 113, and the noise reduction unit 114 in the case where the image signal is a signal shown in FIGS. 7A and 7B.

The image signal at time T shown in FIG. 7B is transferred from the color signal separation unit 111. The image signal $C'^{T-1}$ at time T-1 obtained by applying the noise reduction processing on the image signal $C^{T-1}$ shown in FIG. 7A is transferred from the noise reduction unit 114.

The differential unit 401 calculates the differential signal $C\_\Delta^T$ shown in Expression (7). In this case, two components, that is, the random noise and the motion component are mixed in the differential signal $C\_\Delta^T$. In this example, since the white rectangle is moving in the direction of X axis, a big motion component is detected at the boundary of the rectangle.

The first noise amount $C\_N1^T$ is transferred from the first noise presumption unit 112. Since the first noise amount $C\_N1^T$ is presumed based on the image signal $C^T$ at time T, and the noise model, it does not contain the motion component. The upper limit value setting unit 403 performs the correction which sets the first noise amount $C\_N1^T$ as the upper limit value, when deviating from the first noise amount $C\_N1^T$, as shown in Expression (8). Thereby, the motion component is removed from the differential signal $C\_\Delta^T$ to obtain the second noise amount $C\_N2^T$.

In the noise reduction unit 114, the subtraction processing shown in Expression (1) is performed and the image signal $C'^T$ at time T which underwent the noise reduction processing is generated.

Now, the advantageous effects of the above-described noise reduction processing will be described.

Since the first noise amount presumed from the present image signal does not contain a motion component, the motion component and the random noise are separated using the first noise amount so that these components are separated with high accuracy and a high quality image signal is obtained. Moreover, the presumption of the first of noise amount which is to be used for the separation and the noise reduction processing performed in the subtraction processing has small amount of computation, and enables system wide improvement in the speed and the cost.

Moreover, since the presumption of the first noise amount dynamically adapts to conditions different for each shooting, highly precise and stable presumption can be achieved. Furthermore, the method which obtains the second noise amount by the correction processing based on the first noise amount serves as processing between the homogeneous signals, and therefore, the simplification of the control can be achieved to improve the operability.

Moreover, since the image signal which underwent the noise reduction processing is delayed for a frame unit time to obtain the difference with the present image signal, there are increased affinity and the compatibility with the conventional imaging devices and signal processing systems, and therefore, it is possible to become adjusted to various imaging systems.

Furthermore, in order to process each color signal independently, the separation of the motion component and the random noise can be done with high precision, and therefore, it is possible to obtain a high quality image signal.

Moreover, a Bayer type primary color filter has high affinity with the current imaging systems, and therefore, the combination with various systems becomes possible. It is noted that although the arrangement of a Bayer type primary color filter is used as the imaging device in the above-described embodiment, it is not limited to such an arrangement. For example, it is also possible to use a color difference line sequential complementary color filter, and to use the 2 CCD and the 3 CCD types.

FIG. 9A shows an arrangement of a color difference line sequential complementary color filter. A color difference line sequential system uses 2×2 pixels as the base unit, and cyan (Cy), magenta (Mg), yellow (Ye), and green (G) pixels are arranged 1 for each pixel. However, the position of Mg and G is reversed in every two adjacent lines. In a color difference line sequential complementary color filter, the color signal separation unit 111 reads the image signal by the 10×10 pixels unit shown in FIG. 9A, and separates this for each color filter of Mg, G, Ye, and Cy using 5×5 pixels centering on the pixel of interest as the local area, as is shown in FIG. 9B. The pixel value in the local area at time T is shown by $C^T_{ij}$ (wherein C is the color signal, and C=Mg, G, Ye and Cy).

Moreover, in the case where the differential signal deviates from the first noise amount in the second noise presumption unit 113, the correction processing which sets the first noise amount as the upper limit is done. However, it is not necessary to be limited to such an arrangement.

Figure 10:
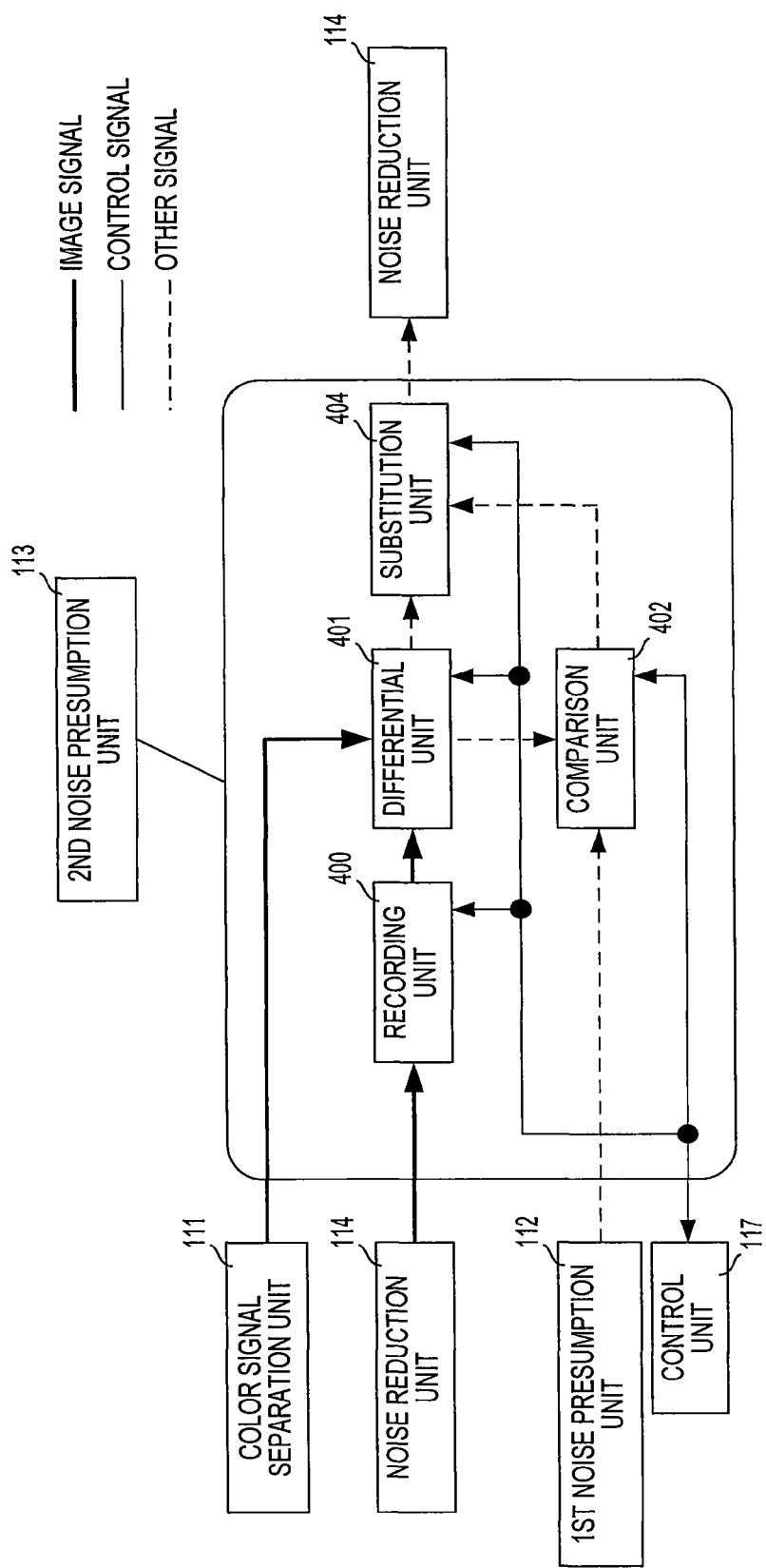
FIG. 10 is a block diagram of the second noise presumption unit in another form.

For example, it is possible to use a simple arrangement, such as replacing with zero when deviating from the first noise amount. FIG. 10 shows an example of another arrangement of the second noise presumption unit 113, and it replaces the upper limit value setting unit 403 shown in FIG. 6 with the substitution unit 404. The basic structure is equivalent to the second noise presumption unit 113 shown in FIG. 6, and the same structure is assigned the same name and the same number.

Hereafter, only the different parts will be described. The differential unit 401 and the comparison unit 402 are connected to the substitution unit 404. The substitution unit 404 is connected to the noise reduction unit 114. The control unit 117 is bidirectionally connected to the substitution unit 404. As is the same with the differential unit 401 and the comparison unit 402 shown in FIG. 6, the differential unit 401 calculates the differential signal $C\_\Delta^T_{22}$, and the comparison unit 402 compares between the differential signal $C\_\Delta^T_{22}$ and the first noise amount $C\_N1^T_{22}$. Based on the control of the control unit 117, the substitution unit 404 obtains the second noise amount $C\_N2^T_{22}$ by performing the correction to the differential signal $C\_\Delta^T_{22}$ from the differential unit 401 based on the comparison result from the comparison unit 402.

$$C\_N2^T_{22}=0(C\_\Delta^T_{22}\geq C\_N1^T_{22})$$

$$C\_N2^T_{22}=C\_\Delta^T_{22}(C\_N1^T_{22}>C\_\Delta^T_{22}>-C\_N1^T_{22})$$

$$C\_N2^T_{22}=0(-C\_N1^T_{22}\geq C\_\Delta^T_{22}) \quad (9)$$

The noise reduction unit 114 in the latter stage performs the subtraction processing between the value of the pixel of interest $C^T_{22}$ and the amount of the second noise $C\_N2^T_{22}$ from the noise amount extraction unit 201, and therefore, the substitution processing shown in Expression (9) means that no processing is performed in the moving area. Since the discrimination ability of eyes in the high-frequency area falls in the moving area generally, the random noise becomes hard to distinguish, and therefore, it can cope with the substitution processing also. The implementation of the substitution processing is easier than the upper limit value setting processing shown in FIG. 6, and therefore, it is possible to reduce the cost of the system.

Furthermore, although an arrangement which is integrated with an imaging unit comprised of the lens system 100, the aperture 101, the CCD 102, the temperature sensor 103, the amplifier 104, the A/D converter 105, the pre-white balance adjustment unit 107, the exposure control unit 108, the focus control unit 109, and the AF motor 110 is used in the above-described embodiment, it is not necessarily be limited to such an arrangement. For example, as shown in FIG. 11, it is possible to process from the recording medium which records the image signal taken in by an imaging unit in another unit in unprocessed Raw data and records the accompanying information, such as information for the color filter of CCD 102 and the exposure information at the time of the shooting in the header section.

Figure 11:
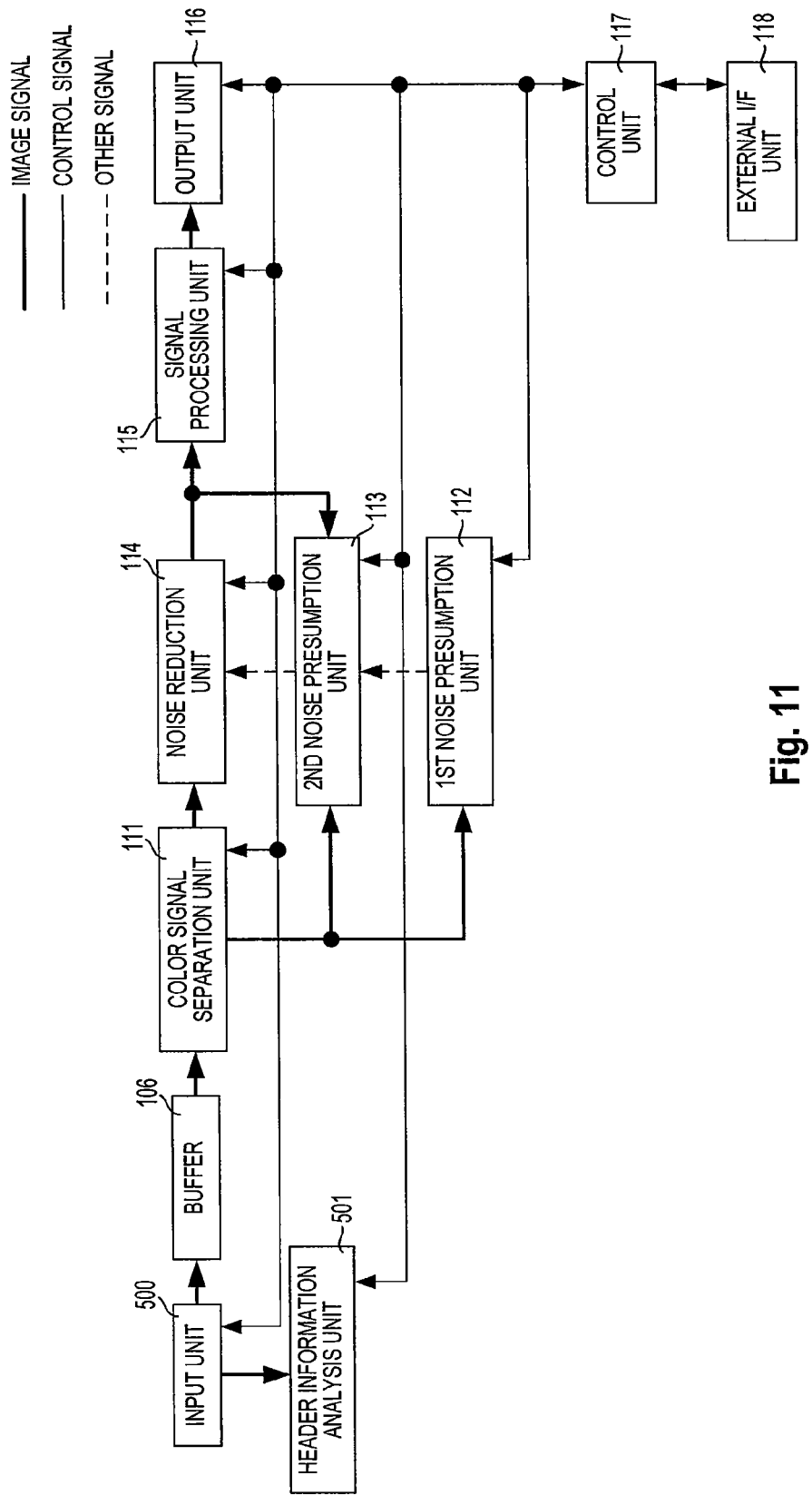
FIG. 11 is a block diagram of the first embodiment in another form.

As compared with the arrangement shown in FIG. 1, FIG. 11 omits the lens system 100, the aperture 101, the CCD 102, the temperature sensor 103, the amplifier 104, the A/D converter 105, the pre-white balance adjustment unit 107, the exposure control unit 108, the focus control unit 109, and the AF motor 110, and adds the input unit 500 and the header information analysis unit 501. The basic structure is equivalent to FIG. 1, and the same structure is assigned the same name and the same number.

Hereafter, only the different parts will be described. The input unit 500 is connected to the buffer 106 and the header information analysis unit 501. The control unit 117 is bidirectionally connected to the input unit 500 and the header information analysis unit 501. The image signal and header information saved in the recording medium are read from the input unit 500 by starting the playback operation through the external I/F units 118, such as a mouse and a keyboard. It is noted that the image signal is read one by one in a predetermined time interval, and the image signal is read one by one for each 1 frame time interval in the present embodiment.

The frame signal from the input unit 500 is transferred to the buffer 106, and the header information is transferred to the header information analysis unit 501. The header information analysis unit 501 extracts the information at the time of the shooting from the header information, and transfers it to the control unit 117. The processing hereafter is equivalent to FIG. 1.

Moreover, although the above-described embodiment is premised on processing by the hardware, it is not necessarily limited to such an arrangement. For example, it is possible to have an arrangement which outputs the image signal from the CCD 102 as unprocessed Raw data, and outputs the accompanying information, etc., such as the information of the color filter of CCD 102 and the exposure information at the time of the shooting as the header information from the control unit 117, and processes separately by software. The software is stored in a computer readable storage medium such as a magnetic disk, a magneto-optical disc, a CD-ROM, a DVD-ROM, a semiconductor memory, etc., or is distributed through communication lines. The software is read into the RAM of a computer and is executed by the CPU of a computer to realize the above-described processing (hereinafter the same).

Figure 12A:
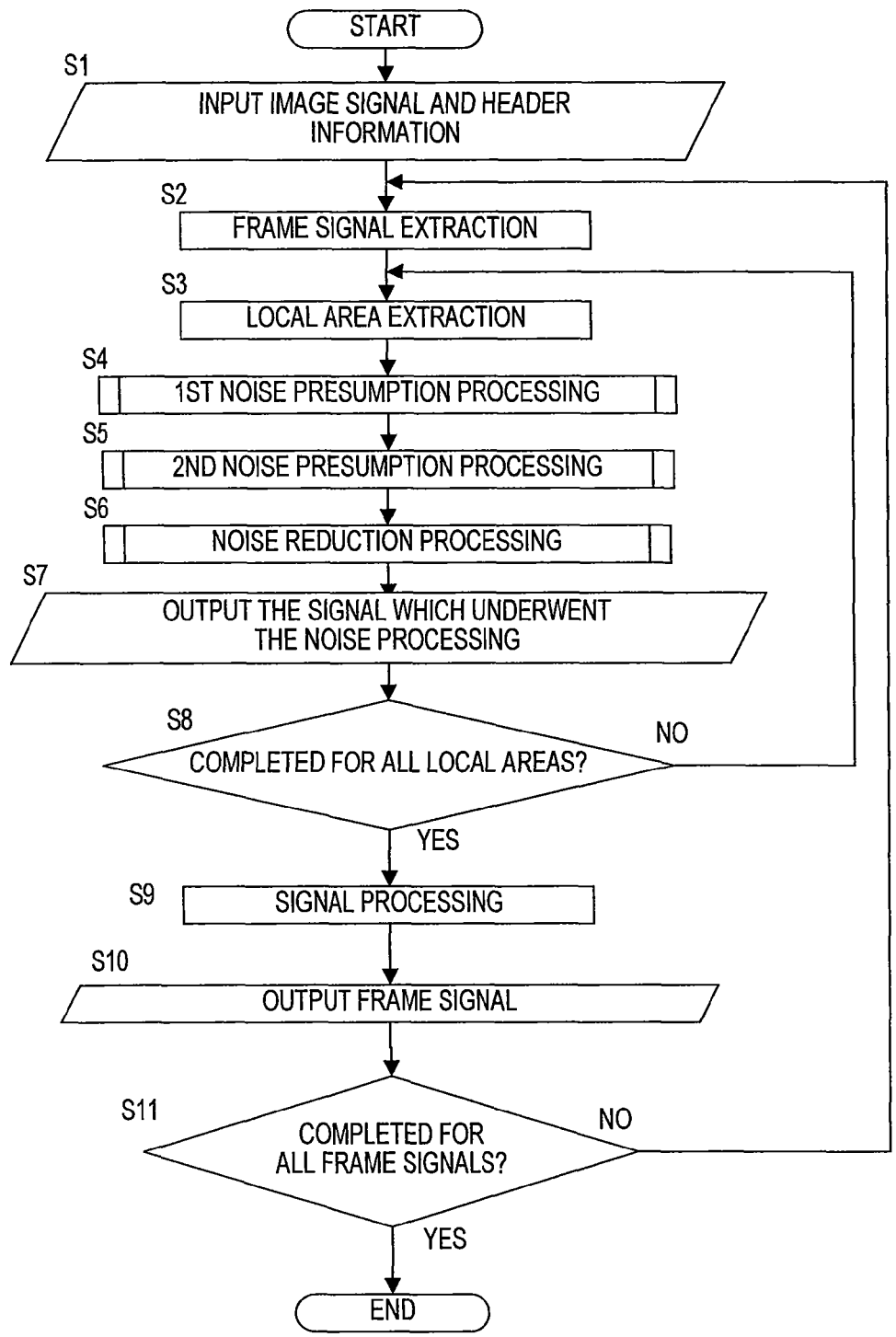
FIGS. 12A-12D are flow charts of the signal processing.

FIG. 12A shows the flow of the software processing in the case of making a computer to execute the above-described signal processing. Hereafter, the processing in each step will be described.

At Step S1, the image signal and the header information, such as exposure information at the time of the shooting are read.

At Step S2, a frame signal is sequentially extracted from the image signal.

At Step S3, as shown in FIG. 2B, the local area of a predetermined size is separated and extracted.

At Step S4, the first noise amount is presumed. This processing is performed according to the flow of FIG. 12B, which will be described later.

At Step S5, the second noise amount is presumed. This processing is performed according to the flow of FIG. 12C, which will be described later.

At Step S6, the noise reduction processing is performed. This processing is performed according to the flow of FIG. 12D, which will be described later.

At Step S7, the signal which underwent the noise reduction processing is outputted.

At Step S8, it determines whether the processing from Step S3 to Step S7 is completed for all the local areas. If it is not completed, the process branches to Step S3, and if it is completed, the process branches to Step S9.

At Step S9, known interpolation processing, emphasis processing, tone processing, and compression processing are performed.

At Step S10, the frame signal after the completion of the processing is outputted.

At Step S11, it determines whether the processing from Step S2 to Step S10 is completed for all of the frame signals. If it is not completed, the process branches to Step S2, and if it is completed, the process ends.

Figure 12B:
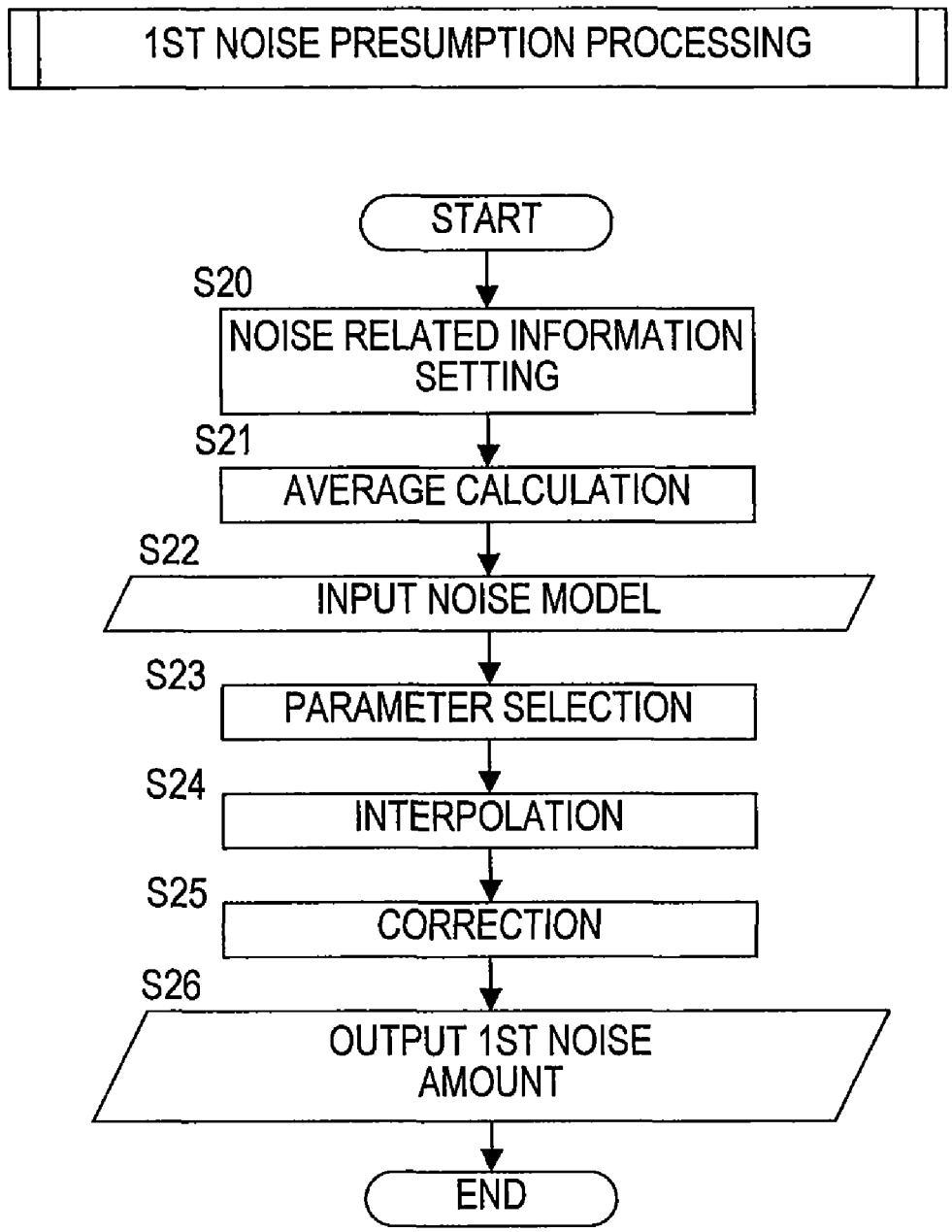

FIG. 12B is a flow related to the first noise presumption processing at Step S4 of FIG. 12A. Hereafter, the processing in each step will be described.

At Step S20, information, such as temperature and gain, based on the read header information. If a parameter required for the header information does not exist, a predetermined standard value is assigned instead.

At Step S21, as shown in Expression (2), the average of the local area is calculated.

At Step S22, the coordinate data and the correction coefficient of a reference noise model are read.

At Step S23, the coordinate data of the segment of a reference noise model to which the value of the pixel of interest belongs, and the corresponding correction coefficient are selected.

At Step S24, the amount of reference noise is obtained by the interpolation processing shown in Expression (5).

At Step S25, the first noise amount is calculated by the correction processing shown in Expression (6).

At Step S26, the first noise amount is outputted and the process ends.

Figure 12C:
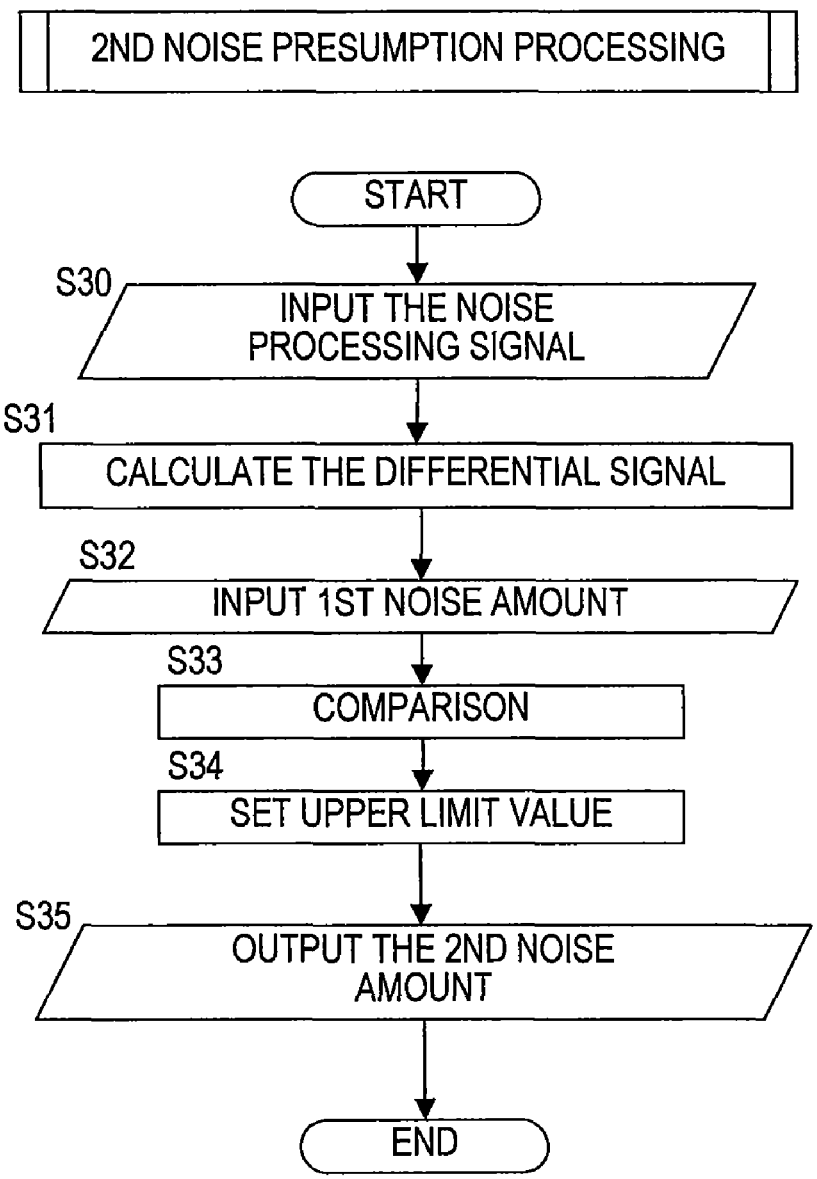

FIG. 12C is a flow of the second noise presumption processing at Step S5 of FIG. 12A. Hereafter, the processing of each step will be described.

At Step S30, the frame signal of the past which underwent the noise reduction processing is inputted, and it is the frame signal of 1 frame past in the present embodiment.

At Step S31, the differential signal is calculated as shown in Expression (7).

At Step S32, the first noise amount is inputted.

At Step S33, it is compared and determined whether the differential signal is contained in the first noise amount or not.

At Step S34, the second noise amount is obtained by providing a restriction which sets the first noise amount as the upper limit to the differential signal as shown in Expression (8).

At Step S35, the second noise amount is outputted and the process ends.

Figure 12D:
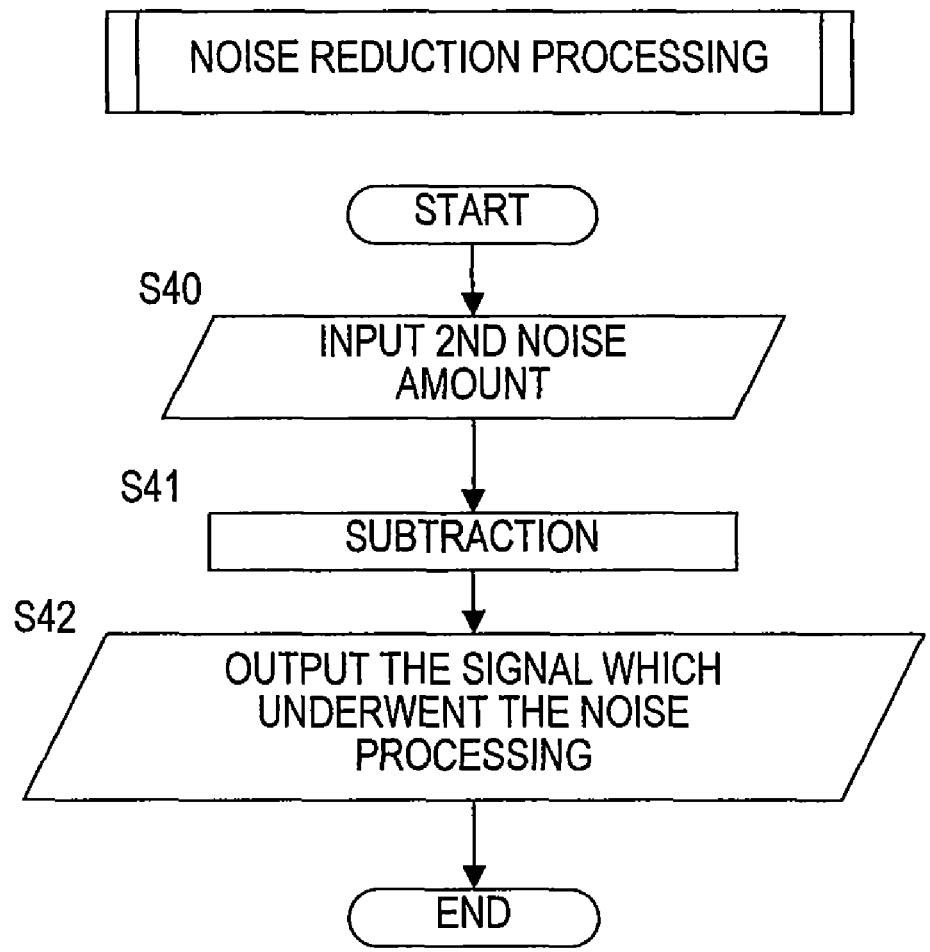

FIG. 12D is a flow of the noise reduction processing at Step S6 of FIG. 12A. Hereafter, the processing of each step will be described.

At Step S40, the second noise amount is inputted.

At Step S41, the subtraction processing is performed between the frame signal and the second noise amount as shown in Expression (1) to obtain the signal which underwent the noise reduction processing.

At Step S42, the signal which underwent the noise reduction processing is outputted, and the process ends.

As described in the above, the signal processing may be done by software, and it is possible to achieve the same functions and advantageous effects with the case where the processing is done by hardware.

Now, the second embodiment of the present invention will be described.

First, the arrangement will be described.

Figure 13:
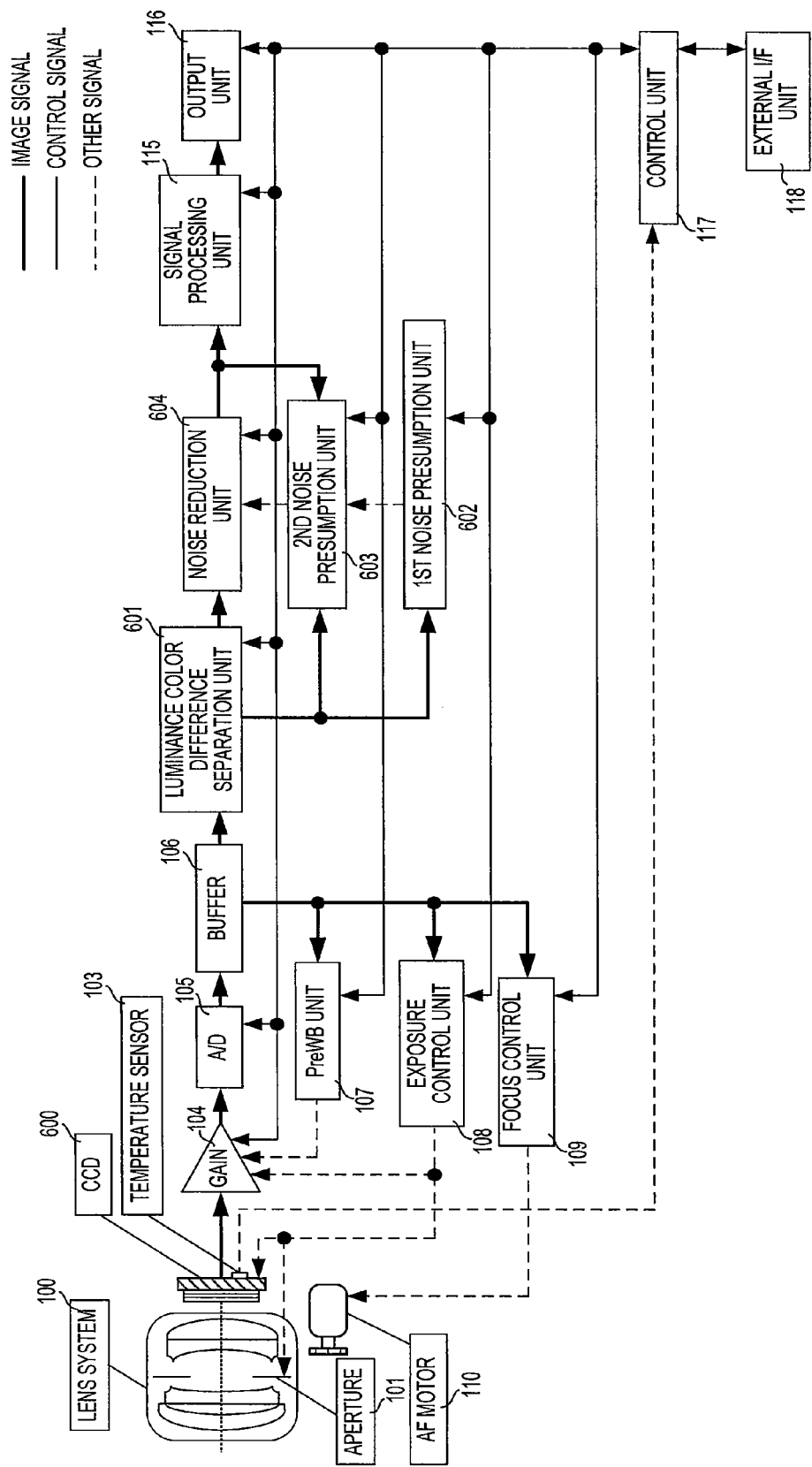
FIG. 13 is a block diagram of the second embodiment.

FIG. 13 is a block diagram of the second embodiment. Compared with the first embodiment shown in FIG. 1, the second embodiment has an arrangement which replaces the CCD 102 with a CCD 600, the color signal separation unit 111 with a luminance color difference separation unit 601, the first noise presumption unit 112 with a first noise presumption unit 602, the second noise presumption unit 113 with a second noise presumption unit 603, and the noise reduction unit 114 with a noise reduction unit 604. The basic structure is equivalent to the first embodiment, and the same structure is assigned the same name and the same number. Hereafter, only the different parts will be described.

The image signal taken in through the lens system 100, the aperture 101, and the CCD 600 is amplified with the amplifier ("GAIN" in the figure) 104, is converted into a digital signal by the A/D converter ("A/D" in the figure) 105, and is transferred to the buffer 106.

The buffer 106 is connected to the pre-white balance adjustment unit ("PreWB unit" in figure) 107, the exposure control unit 108, the focus control unit 109, and the luminance color difference separation unit 601. The luminance color difference separation unit 601 is connected to the first noise presumption unit 602, the second noise presumption unit 603, and the noise reduction unit 604. The first noise presumption unit 602 is connected to the second noise presumption unit 603, and the second noise presumption unit 603 is connected to the noise reduction unit 604. The noise reduction unit 604 is connected to the second noise presumption unit 603 and the signal processing unit 115. The control unit 117 is bidirectionally connected to the luminance color difference separation unit 601, the first noise presumption unit 602, the second noise presumption unit 603, and the noise reduction unit 604.

Now, the details of the signal processing will be described. Since it is substantially equivalent to the first embodiment, only the different parts will be described.

The flow of the image signal will be described with reference to FIG. 13. The shooting mode starts by pushing a shutter release button in the external I/F unit 118. The image signal taken in through the lens system 100, the aperture 101, and the CCD 600 is continuously outputted in a predetermined time interval as an analog signal. It is noted that in the present embodiment, a single CCD which arranges the color difference line sequential complementary color filter in the front is assumed for the CCD 600.

Figure 14A:
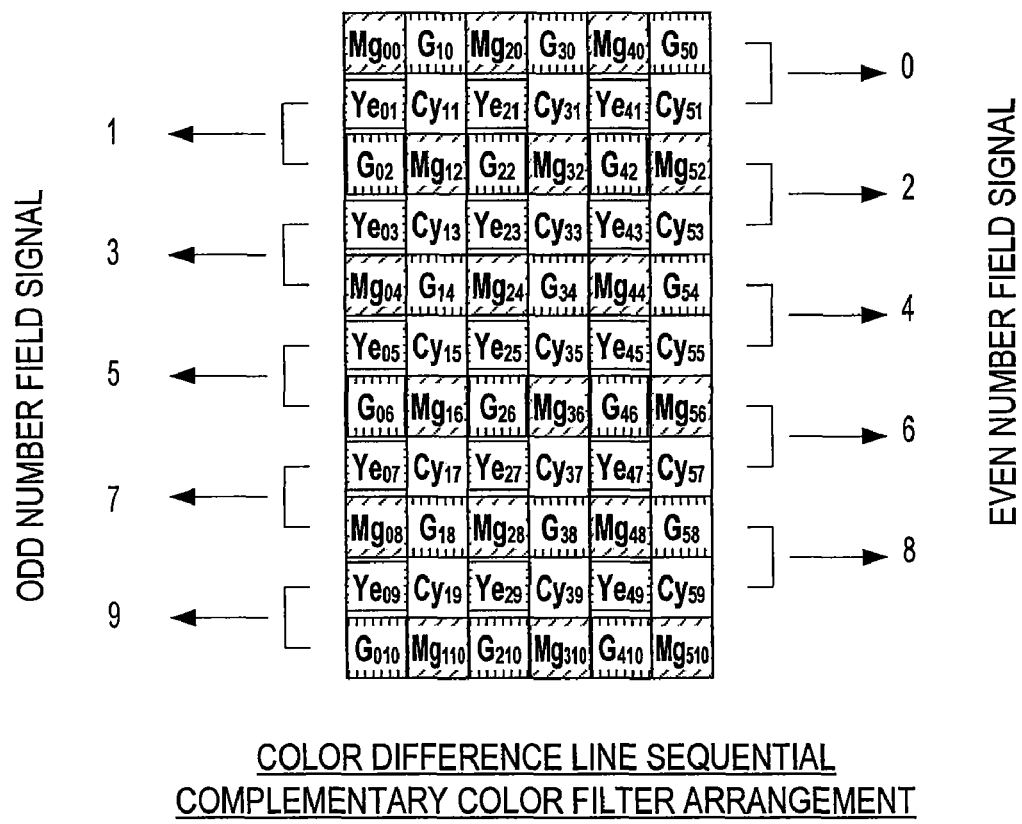
FIGS. 14A-14C are diagrams illustrating the local area of the color difference line sequential complementary color filter.

FIG. 14A shows an arrangement of a color difference line sequential complementary color filter. A color difference line sequential system uses 2×2 pixels as the base unit, and cyan (Cy), magenta (Mg), yellow (Ye), and green (G) pixels are arranged 1 for each pixel. However, the position of Mg and G is reversed in every two adjacent lines.

As shown in FIG. 14A, the image signal from the CCD 600 consists of two field signals (even number field signal and odd number field signal) obtained by adding upper lines and lower lines and classified into even lines and odd lines. Moreover, 1/60 seconds (henceforth referred to as "1 field time") is assumed as the above-described predetermined time interval. One image signal is obtained by combining even number and odd number field signals. Here, one image signal is referred to as a "frame signal". The frame signal is combined at intervals of 1/30 seconds.

The analog signal from the CCD 600 is amplified a predetermined amount at the amplifier 104, is converted into a digital signal at the A/D converter 105, and is transferred to the buffer 106. The buffer 106 can record 2 field signals, that is, 1 frame signal, and is overwritten upon the shootings. Based on the control of the control unit 117, the luminance color difference separation unit 601 calculates the luminance signal Y and the color difference signals Cb and Cr from the even number and odd number field signal.

$$Y = G + Mg + Ye + Cy$$

$$Cb = (Mg + Cy) - (G + Ye)$$

$$Cr = (Mg + Ye) - (G + Cy) \tag{10}$$

Thereafter, the local area comprised of the pixel of interest subjected to perform the noise reduction processing and the proximate pixels located near the pixel of interest is sequentially extracted. In the present embodiment, as for the local area, the luminance signal Y is assumed as 5×5 pixels, and the color difference signals Cb and Cr are assumed as 5×3 pixels.

Figure 14B:
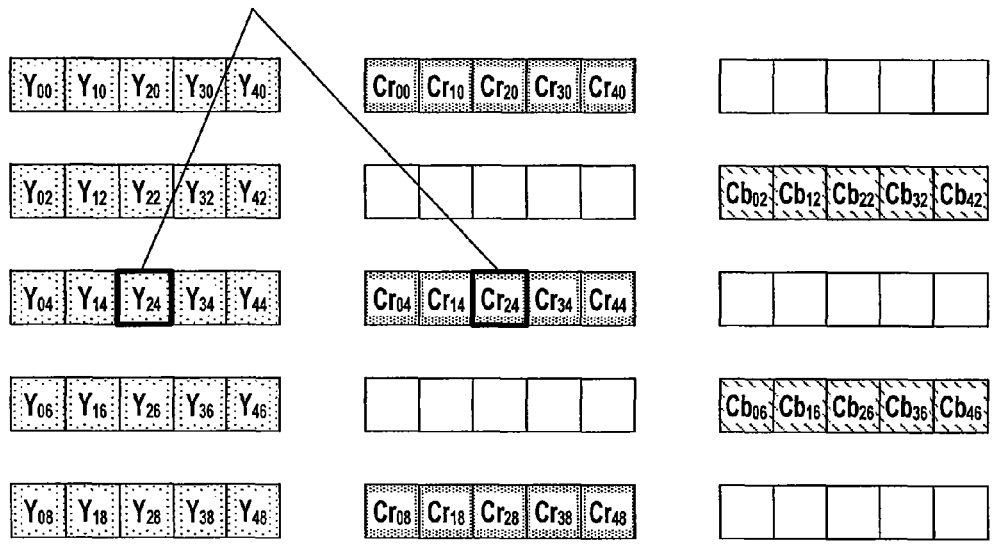
Figure 14C:
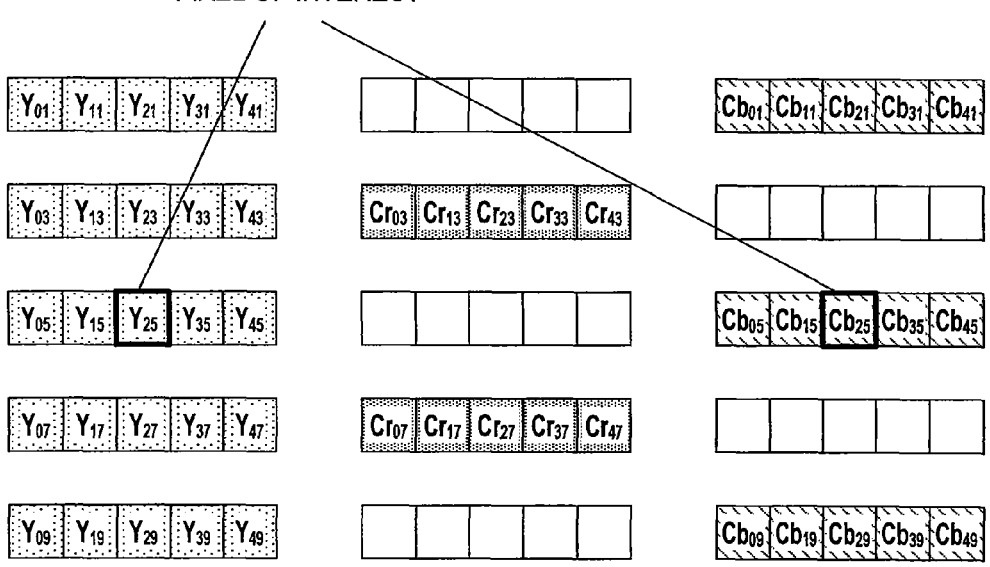

FIGS. 14B and 14C show the local area extracted from the even number and the odd number field signals. FIG. 14B shows an example wherein the luminance signal Y and the color difference signal Cr are extracted from the even number field signal. Since the color difference signal Cr generates every other line, the effective pixel is 5×3 pixels. Moreover, in this example, since the pixel of interest is not obtained, the color difference signal Cb is not used. It is noted that if the position of the pixel of interest is different, in contrary, there may be cases where the color difference signal Cb exists and the color difference signal Cr does not exist.

FIG. 14C shows an example which extracted the luminance signal Y and the color difference signal Cb from the odd number field signal. Since the color difference signal Cb is generated every other line, the effective pixel is 5×3 pixels. Moreover, in this example, since the pixel of interest is not obtained, the color difference signal Cr is not used. It is noted that if the position of the pixel of interest is different, in contrary, there may be cases where the color difference signal Cr exists and the color difference signal Cb does not exist.

Henceforth, the pixel value in the local area at time T is referred to as $C^T_{ij}$. (wherein C indicates a signal, C=Y and Cr, or C=Y and Cb, i is an X coordinate, i=0-4, j is a Y coordinate, and in the case of the luminance signal Y of the even number field signal, j=0, 2, 4, 6 and 8, and in the case of the color difference signal Cr or Cb of the even number field signal, j=0, 4 and 8, in the case of the luminance signal Y of the odd number field signal, j=1, 3, 5, 7 and 9, and in the case of the color difference signal Cb or Cr of the odd number field signal, j=1, 5 and 9) In the case of the even number field signal, the value of the pixel of interest becomes $C^T_{24}$ and in the case of the odd number field signal, it becomes $C^T_{25}$. It is noted that although the description hereinafter is given of the even number field signal and the case of C=Y and Cr as shown in FIG. 14B, it is similarly in effect in the case of the even number field signal and C=Y and Cb and the case of the odd number field signal, with only the structure in the local region being different.

The above-described local area is transferred to the first noise presumption unit 602 and the noise reduction unit 604, and the above-described pixel of interest is transferred to the second noise presumption unit 603. Based on the control of the control unit 117, the first noise presumption unit 602 presumes the first noise amount $C\_N1^T_{24}$ for the value of the pixel of interest $C^T_{24}$ and transfers to the second noise presumption unit 603.

Based on the control of the control unit 117, the second noise presumption unit 603 obtains the differential signals between the pixel of interest $C^T_{24}$ from the luminance color difference separation unit 601 and a plurality of past signals which underwent the noise reduction processing from the noise reduction unit 604, and selects one of these differential signals by using the first noise amount $C\_N1^T_{24}$ from the first noise presumption unit 602, and thereby, presumes the second noise amount $C\_N2^T_{24}$ and transfers to the noise reduction unit 604. In the present embodiment, three types signals, that is, the signal before 2 fields (1 frame before), the signal before 1 field, and the signal before 1 line, are assumed as the past signal.

Based on the control of the control unit 117, the noise reduction unit 604 performs coring processing using the second noise amount $C\_N2^T_{24}$ from the second noise presumption unit 603 with regards to the value of the pixel of interest $C^T_{24}$ from the luminance color difference separation unit 601, and thereby, calculates the value of the pixel of interest $C'^T_{24}$ which underwent the noise reduction processing, and transfers this to the second noise presumption unit 603 and the signal processing unit 115. It is noted that the noise reduction unit 604 may calculate the value of the pixel of interest $C'^T_{24}$ which underwent the noise reduction processing by performing subtraction processing between the value of the pixel of interest $C^T_{24}$ and the second noise amount $C\_N2^T_{24}$ as in the noise reduction unit 114 of the first embodiment.

Processing in the above-described luminance color difference separation unit 601, the first noise presumption unit 602, the second noise presumption unit 603, and the noise reduction unit 604 is performed by synchronizing per local area based on the control of the control unit 117.

Based on the control of the control unit 117, the signal processing unit 115 performs known simultaneous processing to the even number field signal and the odd number field signal which underwent the noise reduction processing to synthesize the frame signal, and thereby, performs known emphasis processing, tone processing, compression processing, etc., to the frame signal, and transfers to the output unit 116. The output unit 116 records and saves the image signal in recording media, such as a magnetic disk and a memory card.

Figure 15:
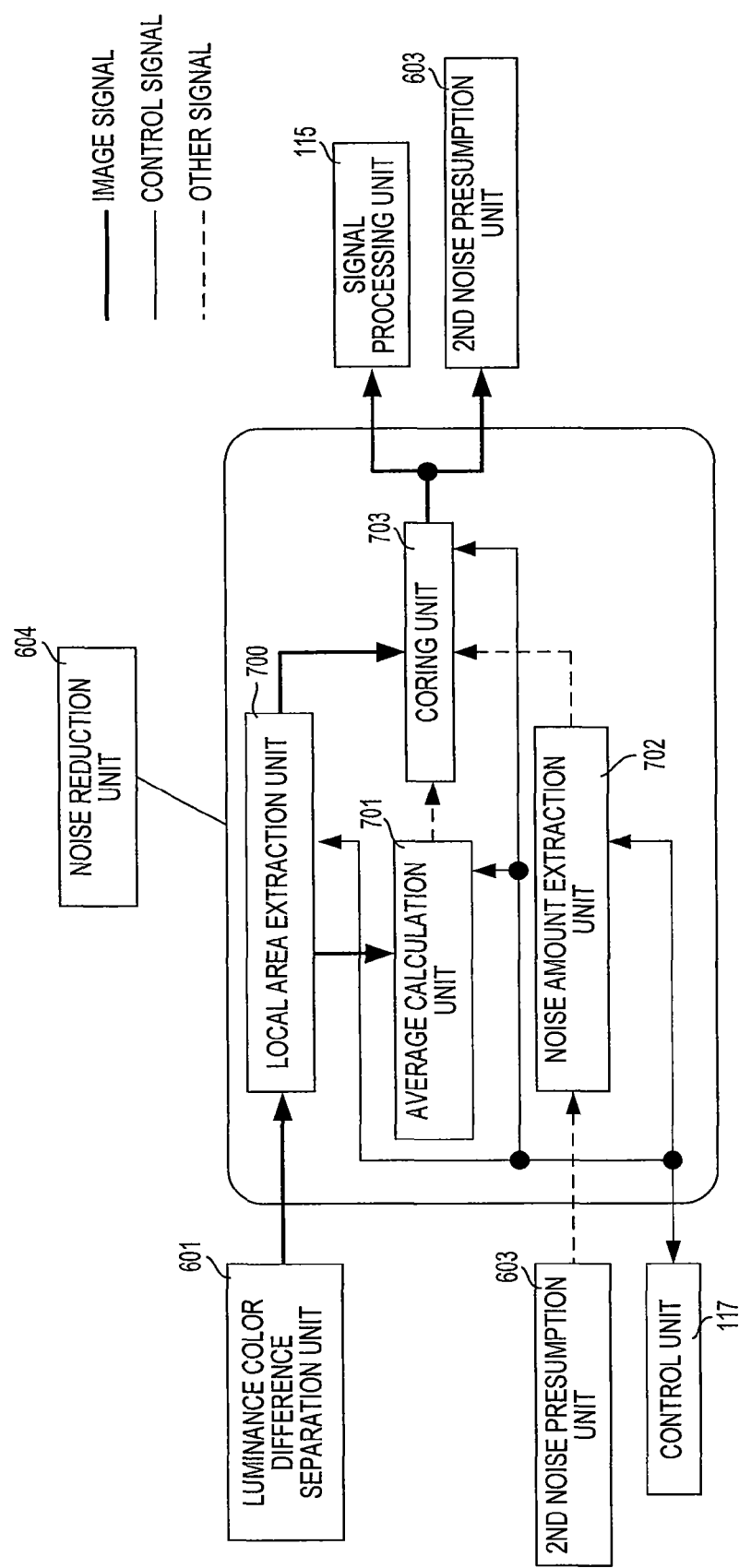
FIG. 15 is a block diagram of the noise reduction unit.

FIG. 15 shows an example of an arrangement of the noise reduction unit 604, and the noise reduction unit 604 is comprised of a local area extraction unit 700, an average calculation unit 701, a noise amount extraction unit 702, and a coring unit 703.

The luminance color difference separation unit 601 is connected to the local area extraction unit 700, and the local area extraction unit 700 is connected to the average calculation unit 701 and the coring unit 703. The second noise presumption unit 603 is connected to the noise amount extraction unit 702, and the noise amount extraction unit 702 is connected to the coring unit 703. The coring unit 703 is connected to the second noise presumption unit 603 and the signal processing unit 115. The control unit 117 is bidirectionally connected to the local area extraction unit 700, the average calculation unit 701, the noise amount extraction unit 702, and the coring unit 703.

Although the following description is given with regards to even number field signals, it is similarly in effect with odd number field signals, with only the arrangement of the local area being different.

Based on the control of the control unit 117, the local area extraction unit 700 reads the local area from the luminance color difference separation unit 601, and transfers the local area to the average calculation unit 701, and the pixel of interest in the local area to the coring unit 703. Based on the control of the control unit 117, the average calculation unit 701 calculates the average of the local area C_AV (C=Y and Cr).

$$Y\_AV = \frac{\sum_{i,j} Y^T_{ij}}{25} \quad (11)$$

$$Cr\_AV = \frac{\sum_{i,j} Cr^T_{ij}}{15}$$

In Expression (11), i=0-4, and in the case of the luminance signal Y, j=0, 2, 4, 6 and 8, and in the case of the color difference signal Cr, j=0, 4 and 8. The computed average C_AV is transferred to the coring unit 703.

Based on the control of the control unit 117, the noise amount extraction unit 702 reads the second noise amount $C\_N2^T_{24}$ from the second noise presumption unit 603, and transfers it to the coring unit 703.

Based on the control of the control unit 117, the coring unit 703 performs the coring processing to the value of the pixel of interest $C^T_{24}$ from the local area extraction unit 700 using the average C_AV from the average calculation unit 701, and the second noise amount $C\_N2^T_{24}$ from the noise amount extraction unit 702 to obtain the value of the pixel of interest $C'^T_{24}$ which underwent the noise reduction processing.

$$C'^T_{24} = C^T_{24} - C\_N2^T_{24} (C^T_{24} \geq C\_AV + C\_N2^T_{24})$$

$$C'^T_{24} = C\_AV (C\_AV + C\_N2^T_{24} > C^T_{24} > C\_AV - C\_N2^T_{24})$$

$$C'^T_{24} = C^T_{24} + C\_N2^T_{24} (C\_AV - C\_N2^T_{24} \geq C^T_{24}) \quad (12)$$

The value of the pixel of interest $C'^T_{24}$ which underwent the noise reduction processing is transferred to the second noise presumption unit 603 and the signal processing unit 115.

It is noted that although the above arrangement is an arrangement that use the average of the local area for the coring processing, it is not limited to such an arrangement. For example, it may have an arrangement which performs applicative low pass filter processing corresponding to the second noise amount $C\_N2^T_{24}$.

Figure 16:
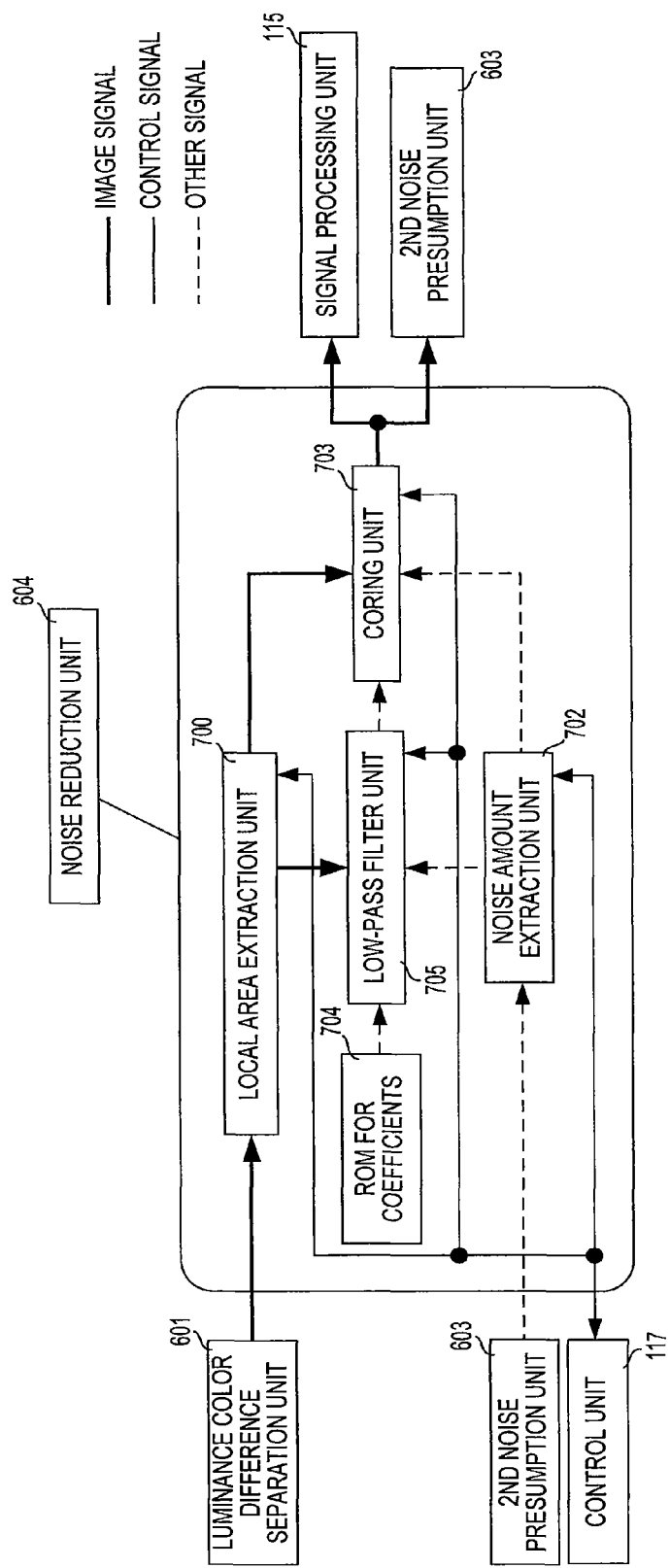
FIG. 16 is a block diagram of the noise reduction unit in another form.

FIG. 16 shows an example of another arrangement of the noise reduction unit 604 wherein the average calculation unit 701 shown in FIG. 15 is removed and a ROM for coefficients 704 and a low pass filter unit 705 are added. The basic structure is equivalent to the noise reduction unit 604 shown in FIG. 15, and the same structure is assigned the same name and the same number. Hereafter, only the different parts will be described.

The local area extraction unit 700, the noise amount extraction unit 702, and the ROM for coefficients 704 are connected to the low pass filter unit 705. The low pass filter unit 705 is connected to the coring unit 703. The control unit 117 is bidirectionally connected to the low pass filter unit 705. Based on the control of the control unit 117, the low pass filter unit 705 selects and reads the filter coefficient used for the low pass filter processing from the ROM for coefficients 704 using the second noise amount $C\_N2^T_{24}$ from the noise amount extraction unit 702.

Figures 17, 18:
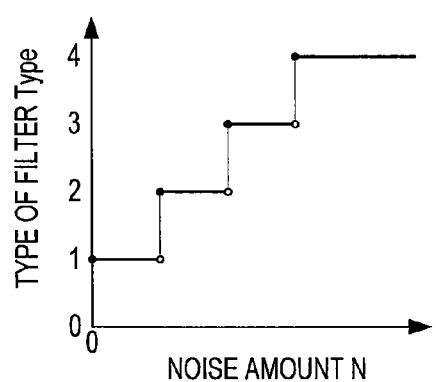
FIG. 17 is a diagram illustrating the smoothing filter.
FIG. 18 is a diagram illustrating the selection of the smoothing filter.

FIG. 17 shows an example of the filter coefficient recorded in the ROM for coefficients 704, wherein four types of frequency characteristics, Type 1-Type 4, each filter having size of 5×5 pixels, is recorded. It is noted that the value of each coefficient in FIG. 17 is multiplied by 128. Type 1 has frequency characteristics which maintains high frequency components and reduces high frequency components gradually until Type 4. The low pass filter unit 705 selects one of the frequency characteristics of Type 1-Type 4 based on the second noise amount $C\_N2^T_{24}$.

For example, this selection is done based on the relation between the noise amount N and the type of filter (Type) which is shown in FIG. 18. The larger the noise amount N is, the filter having frequency characteristics which reduces the high frequency components more is selected. The low pass filter unit 705 performs low pass filter processing to the local area from the local area extraction unit 700 based on the selected filter coefficient.

It is noted that although in the case of the luminance signal Y, the local area is 5×5 pixels and it matches with the size of the low pass filter, in the case of the color difference signal Cr, the local area is 5×3 pixel and it does not match with the size of the low pass filter. In this case, the pixels that are not present are excluded from the subject to perform the low pass filter processing, and the normalization is done based on the filter coefficient of the pixel that is actually used.

The result of the low pass filter processing is transferred to the coring unit 703. The coring unit 703 replaces the average C_AV in Expression (12) with the result of the low pass filter processing, and performs the coring processing.

Figure 19:
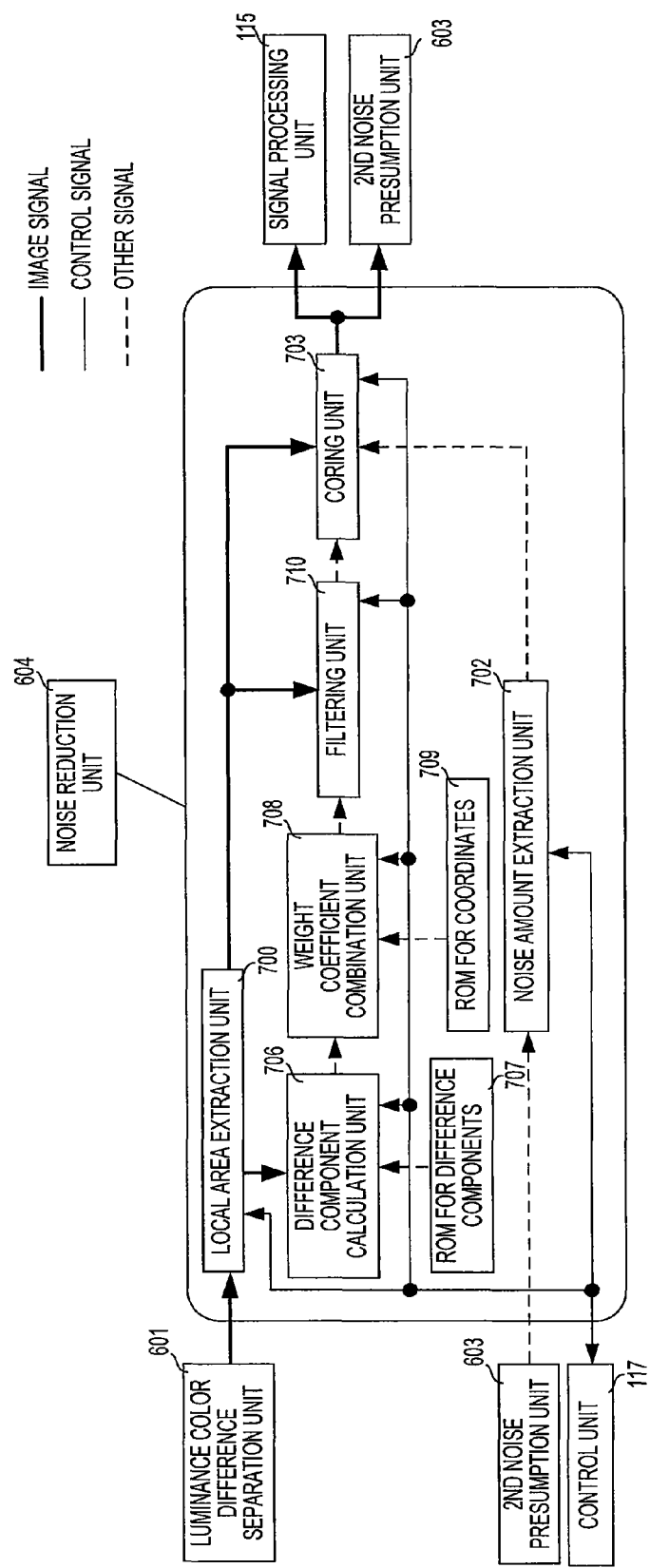
FIG. 19 is a block diagram of the noise reduction unit in another form.

Furthermore, instead of the average of the local area, the arrangement which performs bilateral filter processing is also possible. FIG. 19 shows an example of an arrangement where the noise reduction unit 604 performs bilateral filter processing. The average calculation unit 701 shown in FIG. 15 is removed and a difference component calculation unit 706, a ROM for differential components 707, a weight coefficient combination unit 708, a ROM for coordinates 709, and a filtering unit 710 are added. The basic structure is equivalent to the noise reduction unit 604 shown in FIG. 15, and the same structure is assigned the same name and the same number. Hereafter, only the different parts will be described.

The local area extraction unit 700 is connected to the difference component calculation unit 706, the filtering unit 710, and the coring unit 703. The difference component calculation unit 706 is connected to the coring unit 703 through the weight coefficient combination unit 708 and the filtering unit 710. The ROM for differential components 707 is connected to the difference component calculation unit 706, and the ROM for coordinates 709 is connected to the weight coefficient combination unit 708. The control unit 117 is bidirectionally connected to the difference component calculation unit 706, the weight coefficient combination unit 708, and the filtering unit 710.

Based on the control of the control unit 117, the difference component calculation unit 706 reads the local area from the local area extraction unit 700, and calculates the absolute value $\delta^T_{ij}$ of the difference component with the value of the pixel of interest $C^T_{24}$ as shown in Expression (13).

$$\delta^T_{ij} = |C^T_{ij} - C^T_{24}| \quad (13)$$

Thereafter, the difference component calculation unit 706 reads the first weight coefficient $w1_{ij}$ which corresponds to the absolute value $\delta^T_{ij}$ of the difference component from the ROM for differential components 707. For example, the first weight coefficient $w1_{ij}$ is defined by the function formula shown in Expression (14).

$$w1_{ij} = e^{-\frac{(\delta^T_{ij})^2}{2\cdot\sigma1^2}} 1 \quad (14)$$

σ1 in Expression (14) is a parameter for adjustment, and σ1=about from 1 to 10 is used. The ROM for differential components 707 is a table in which the first weight coefficient $w1_{ij}$ calculated in advance based on the function formula shown in Expression (14) is recorded.

The obtained first weight coefficient $w1_{ij}$ is transferred to the weight coefficient combination unit 708. Based on the control of the control unit 117, the weight coefficient combination unit 708 reads the first weight coefficient $w1_{ij}$ from the difference component calculation unit 706 and the second weight coefficient $w2_{ij}$ corresponding to the coordinates value (i, j) from the ROM for coordinates 709, and combines these. For example, the second weight coefficient $w2_{ij}$ is defined by the function formula shown in Expression (15).

$$w2_{ij} = e^{-\frac{(i-Ti)^2 + (j-Tj)^2}{2\cdot\sigma2^2}} \quad (15)$$

σ2 in Expression (15) is a parameter for adjustment, and σ2=about from 1 to 10 is used. Moreover, $T_i$ and $T_j$ mean the coordinates of the pixel of interest, and are $T_i=2$ and $T_j=4$ in the present embodiment. The ROM for coordinates 709 is a table in which the second weight coefficient $w2_{ij}$ calculated in advance based on the function formula shown in Expression (15) is recorded. The first weight coefficient $w1_{ij}$ and the second weight coefficient $w2_{ij}$ are combined based on Expression (16) to calculate the weighting coefficient $w_{ij}$.

$$w_{ij} = w1_{ij} \cdot w2_{ij} \quad (16)$$

The calculated weighting coefficient $w_{ij}$ is transferred to the filtering unit 710. Based on the control of the control unit 117, the filtering unit 710 performs filtering processing to the local area from the local area extraction unit 700 using the weighting coefficient $w_{ij}$ from the weight coefficient combination unit 708. It is noted the filtering processing includes a process for normalizing with a total sum of the weighting coefficient $w_{ij}$. The result of the filtering processing is transferred to the coring unit 703.

The coring unit 703 replaces the average C_AV in Expression (12) with the result of filtering processing, and performs the coring processing.

Figure 20:
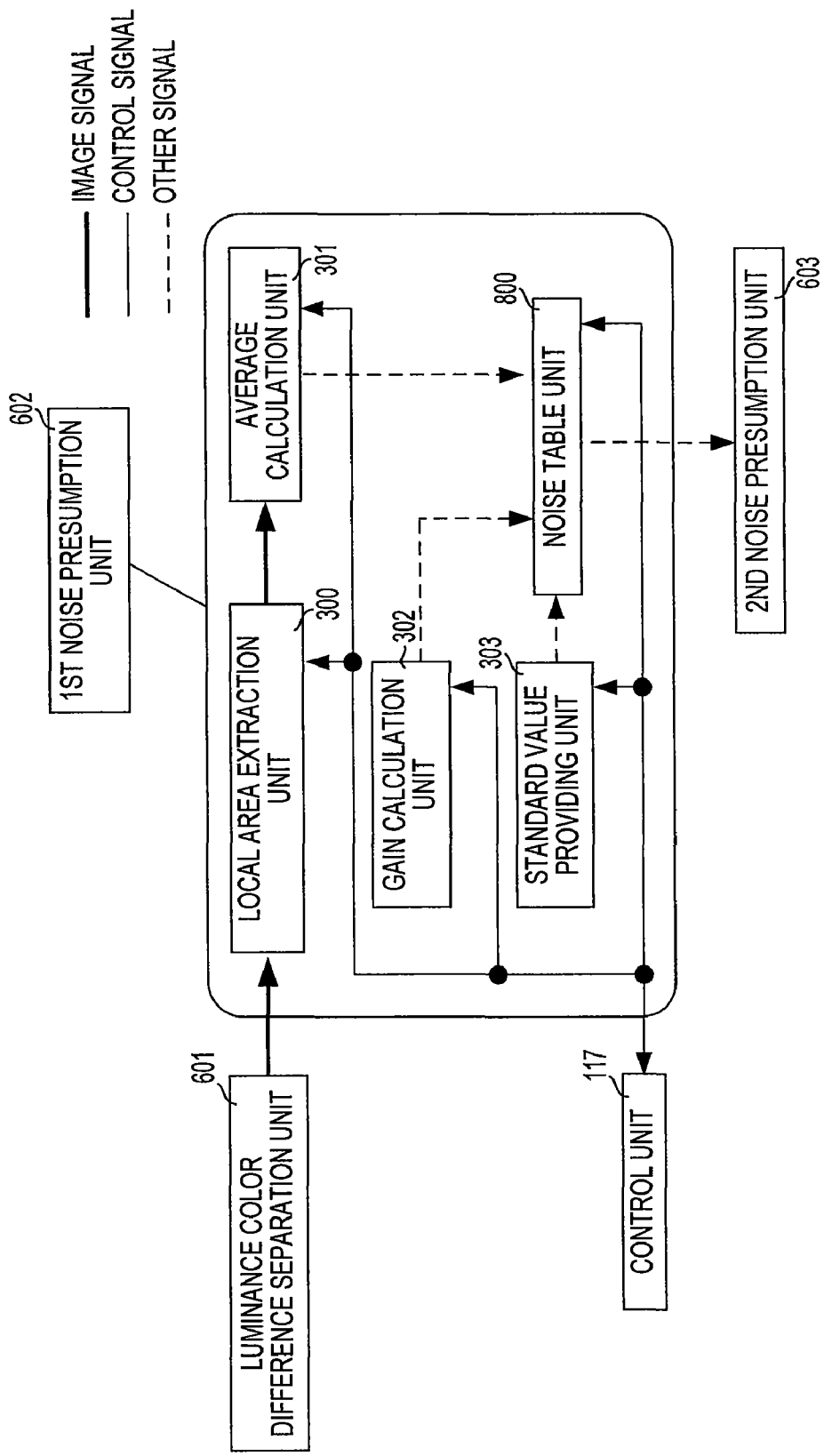
FIG. 20 is a block diagram of the first noise presumption unit.

FIG. 20 shows an example of an arrangement of the first noise presumption unit 602, wherein the noise table unit 800 is added to the first noise presumption unit 112 shown in FIG. 4 of the first embodiment, and the ROM for parameters 304, the parameter selection unit 305, the interpolation unit 306, and the correction unit 307 are omitted. The basic structure is equivalent to the first noise presumption unit 112 shown in FIG. 4, and the same structure is assigned the same name and the same number. Hereafter, only the different parts will be described.

The luminance color difference separation unit 601 is connected to the local area extraction unit 300. The average calculation unit 301, the gain calculation unit 302, and the standard value providing unit 303 are connected to the noise table unit 800. The noise table unit 800 is connected to the second noise presumption unit 603. The control unit 117 is bidirectionally connected to the noise table unit 800. It is noted that although the following description is given with respect to the even number field signal in order to simplify the description, it is similarly in effect with the odd number field signal, with only the arrangement of the local area being different.

Based on the control of the control unit 117, the local area extraction unit 300 sequentially extracts the local area of 5×5 pixels or 5×3 pixels shown in FIG. 14B and transfers it to the average calculation unit 301. Based on the control of the control unit 117, the average calculation unit 301 calculates the average C_AV for the local area from the local area extraction unit 300 as shown in Expression (11). The average C_AV is transferred to the noise table unit 800.

The gain calculation unit 302 obtains the amount of amplification at the amplifier 104 based on the ISO sensitivity and the exposure information which are transferred from the control unit 117, and transfers it to the noise table unit 800. Moreover, the control unit 117 acquires the temperature information on the CCD 600 from the temperature sensor 103, and transfers this to the noise table unit 800.

The noise table unit 800 outputs the noise amount based on the average for the local area from the average calculation unit 301, the information on the gain from the gain calculation unit 302, and the temperature information from the control unit 117. The noise table unit 800 includes a look up table in which the relation between the temperature, the signal value level, the gain, and the noise amount are recorded. The noise amount N obtained at the noise table unit 800 is transferred to the second noise presumption unit 113 as the first noise amount $C\_N1^T_{24}$ of the value of the pixel of interest $C^T_{24}$.

It is noted that in the process of the above-described noise amount calculation, it is not necessary to obtain information, such as the temperature t and the gain g, upon every shooting. An arrangement which records arbitrary information into the standard value providing unit 303, and omits the calculation process is also possible. Thereby, high speed processing, power saving, etc., are made possible. Moreover, although the first noise amount $C\_N1^T_{24}$ is obtained herein using the look up table, the first noise amount $C\_N1^T_{24}$ may be obtained using the noise model as in the first embodiment.

Figure 21:
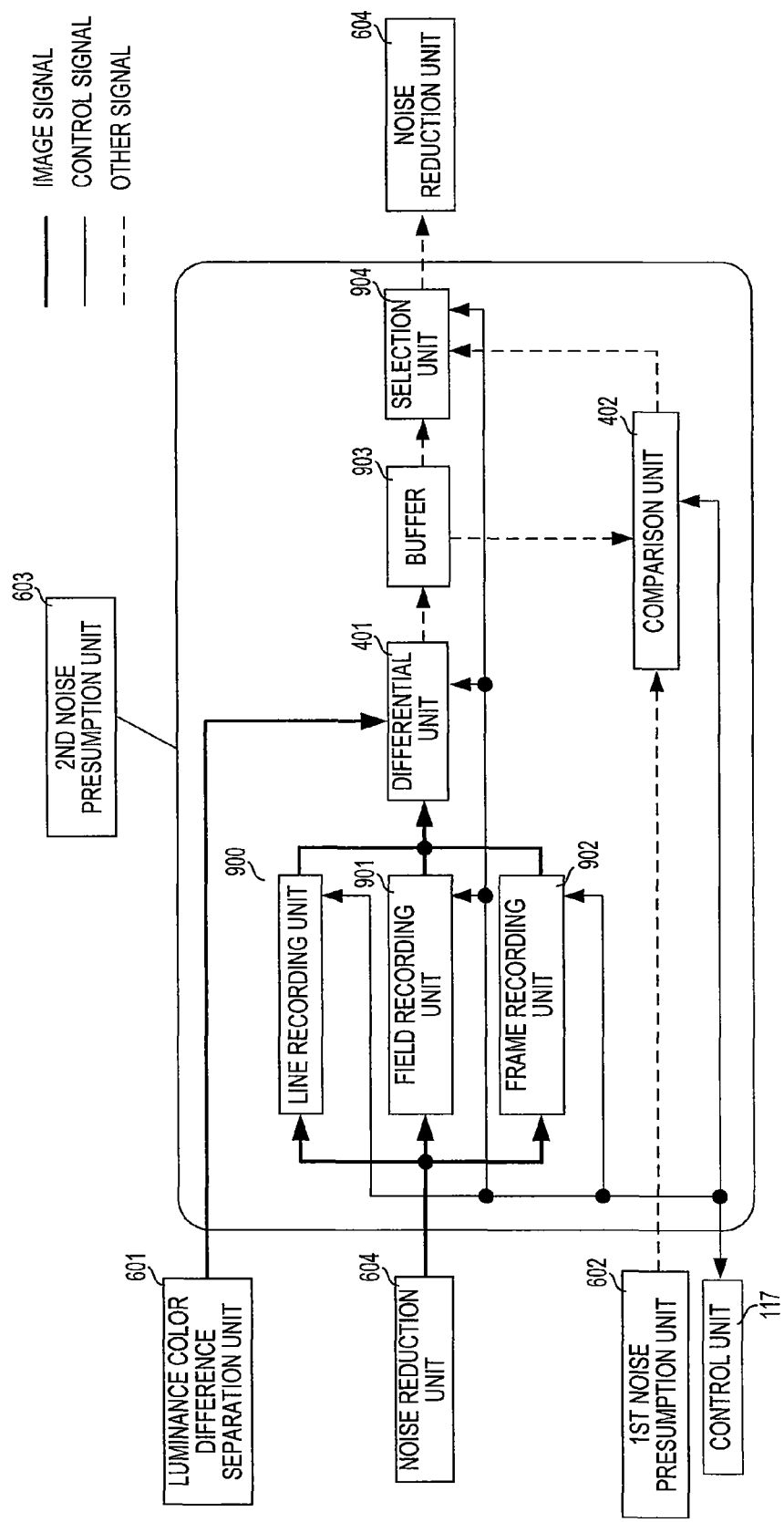
FIG. 21 is a block diagram of the second noise presumption unit.

FIG. 21 shows an example of an arrangement of the second noise presumption unit 603, wherein a line recording unit 900, a field recording unit 901, a frame recording unit 902, a buffer 903, and a selection unit 904 are added to the second noise presumption unit 113 shown in FIG. 6 of the first embodiment, and the recording unit 400 and the upper limit value setting unit 403 are omitted. The basic structure is equivalent to the second noise presumption unit 113 shown in FIG. 6, and the same structure is assigned the same name and the same number. Hereafter, only the different parts will be described.

The noise reduction unit 604 is connected to the line recording unit 900, the field recording unit 901, and the frame recording unit 902, and the line recording unit 900, the field recording unit 901, the frame recording unit 902, and the luminance color difference separation unit 601 are connected to the differential unit 401. The differential unit 401 is connected to the buffer 903, and the buffer 903 is connected to the comparison unit 402 and the selection unit 904. The first noise presumption unit 602 is connected to the comparison unit 402, and the comparison unit 402 is connected to the selection unit 904. The control unit 117 is bidirectionally connected to the line recording unit 900, the field recording unit 901, the frame recording unit 902, and the selection unit 904. The selection unit 904 is connected to the noise reduction unit 604. Although the following description with regards to the even number field signal, it is similarly in effect with the arrangement of the local area, with only the odd number field signal being different.

The signal which underwent the noise reduction processing from the noise reduction unit 604 is transferred to and recorded in the line recording unit 900, the field recording unit 901, and the frame recording unit 902 per pixel. The line recording unit 900 records the signal before 1 line, the field recording unit 901 records the signal before 1 field, and the frame recording unit 902 records the signal before 1 frame.

Based on the control of the control unit 117, the differential unit 401 reads the value of the pixel of interest $Y^T_{24}$ or $Cr^T_{24}$ from the luminance color difference separation unit 601, the signal $Y'^T_{22}$ or $Cr'^T_{20}$ before 1 line from the line recording unit 900, the signal $Y'^{T-1}_{23}$ and $Y'^{T-1}_{25}$, or $Cr'^{T-1}_{23}$, and $Cr'^{T-1}_{27}$ before 1 field from the field recording unit 901, and the signal $Y'^{T-2}_{24}$ or $Cr'^{T-2}_{24}$ before 1 frame from the frame recording unit 902, and performs the differential processing between those two, and thereby, the line differential signal $C\_\Delta1^T_{24}$, the field differential signal $C\_\Delta2^T_{24}$, and the frame differential signal $C\_\Delta3^T_{24}$ are obtained. As to the luminance signal, it becomes:

$$Y\_\Delta1^T_{24} = Y^T_{24} - Y'^T_{22}$$

$$Y\_\Delta2^T_{24} = Y^T_{24} - (Y'^{T-1}_{23} + Y'^{T-1}_{25})/2$$

$$Y\_\Delta3^T_{24} = Y^T_{24} - Y'^{T-2}_{24} \quad (17)$$

As to the color difference signal, it becomes:

$$Cr\_\Delta1^T_{24} = Cr^T_{24} - Cr'^T_{20}$$

$$Cr\_\Delta2^T_{24} = Cr^T_{24} - (3Cr'^{T-1}_{23} + Cr'^{T-1}_{27})/4$$

$$Cr\_\Delta3^T_{24} = Cr^T_{24} - Cr'^{T-2}_{24} \quad (18)$$

Figure 22A:
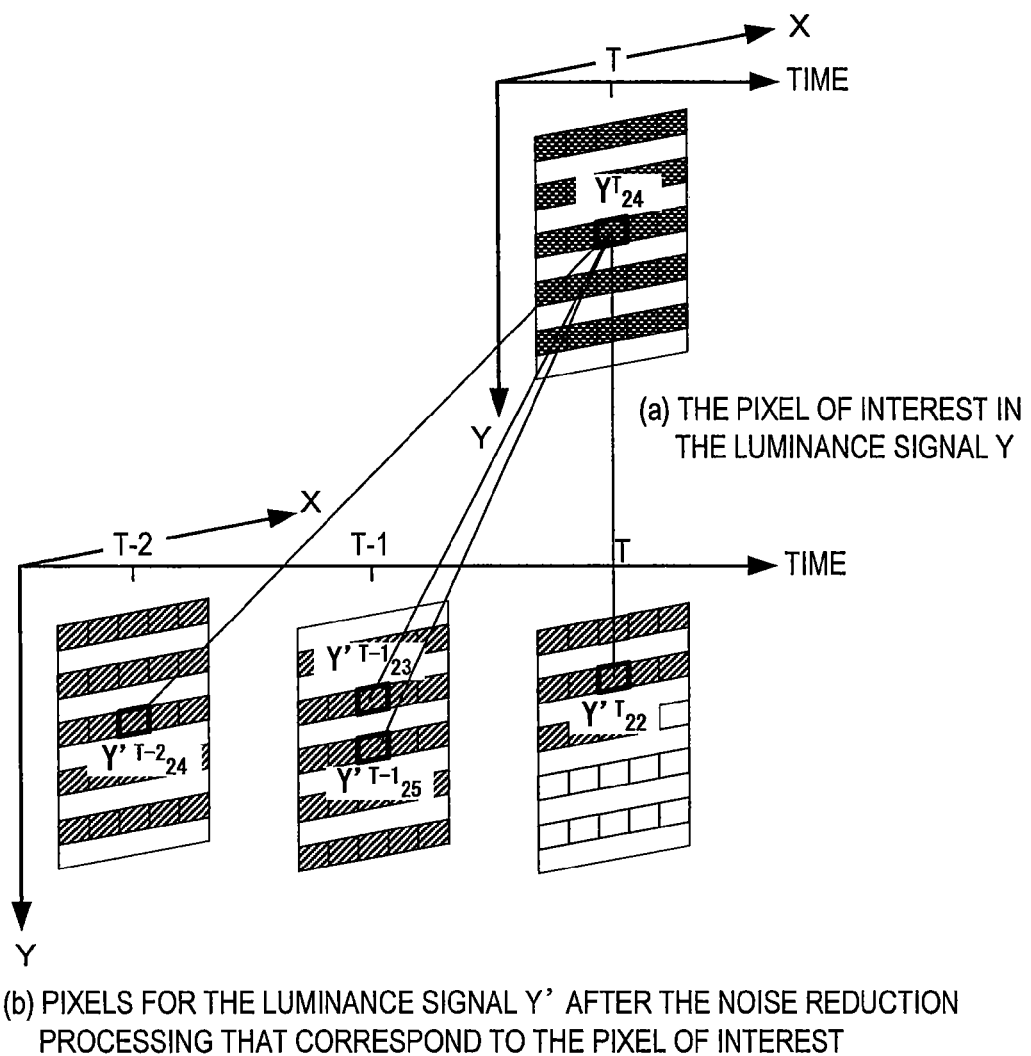
FIGS. 22A and 22B are diagrams illustrating the image signal of the past used in the second noise presumption unit.
Figure 22B:
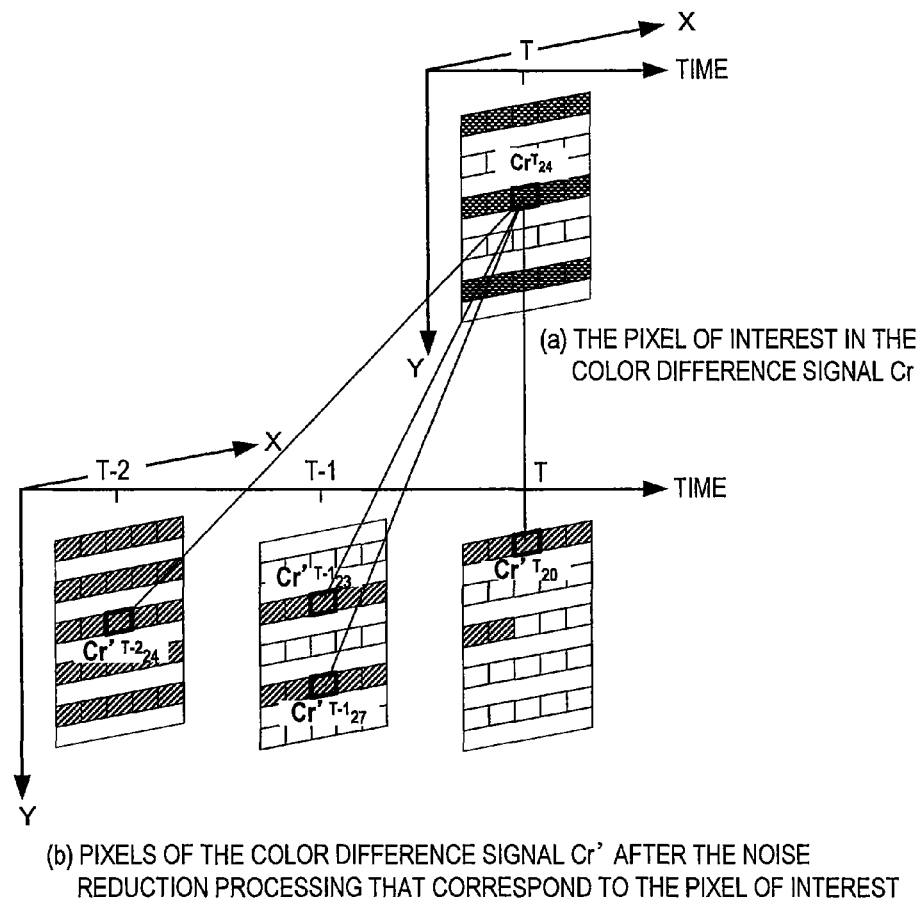

FIG. 22A and FIG. 22B show the positional relation between the above-described pixel of interest, and the signal before 1 line, the signal before 1 field, and the signal before 1 frame.

FIG. 22A (a) shows the 5×5 pixels local area and the pixel of interest $Y^T_{24}$ for the luminance signal at time T. FIG. 22A (b) shows the luminance signal which underwent the noise reduction processing at 1 line before time T, at 1 field before time T−1, and at 1 frame before time T−2. Although the pixel on the same coordinates with the pixel of interest $Y^T_{24}$ is selected from the luminance signal before 1 frame, since there is no pixel on the same coordinates in the luminance signal before 1 line and before 1 field, the proximate pixel(s) are selected.

FIG. 22B (a) shows a 5×3 pixels local area and the pixel of interest $CrT_{24}$ for the color difference signal at time T. FIG. 22B (b) shows the color difference signal which underwent the noise reduction processing 1 line before time T, 1 field before time T−1, and 1 frame before time T−2. Although a pixel on the same coordinates with the pixel of interest $CrT_{24}$ is selected from the color difference signal before 1 frame, since there is no pixel on the same coordinates in the color difference signal before 1 line and before 1 field, the proximate pixel(s) are selected.

Due to the above-described pixel arrangement, with respect to the correlation characteristics with the pixel of interest in the static region, there is a relationship of:

signal before 1 frame≧signal before 1 field≧signal before 1 line

The accuracy with respect to the noise reduction processing is also in this order. On the other hand, the accuracy of the moving area is in a relation of:

signal before 1 line≧signal before 1 field≧signal before 1 frame

The differential signals $\Delta1^T_{24}$, $\Delta2^T_{24}$, and $\Delta3^T_{24}$ shown in Expression (17) or (18) are transferred to and recorded in the buffer 903.

Based on the control of the control unit 117, the comparison unit 402 reads the differential signal $\Delta1^T_{24}$, $\Delta2^T_{24}$, and $\Delta3^T_{24}$ from the buffer 903, and the first noise amount $C\_N1^T_{24}$ corresponding to the value of the pixel of interest $C^T_{24}$ from the first noise presumption unit 602, and compares these signals. The comparison is performed in an order of $\Delta3^T_{24}$ before 1 frame, $\Delta2^T_{24}$ before 1 field, followed by, $\Delta1^T_{24}$ before 1 line, and if it became less than or equal to the first noise amount $C\_N1^T_{24}$, the result is immediately transferred to the selection unit 904. This is because the accuracy in the noise reduction processing in the static region is higher in an order of, signal before 1 frame, signal before 1 field, followed by signal before 1 line, and therefore, the selection is made on a priority of this order.

It is noted that in the case where it does not go less than the first noise amount $C\_N1^T_{24}$, even with $\Delta1^T_{24}$ before 1 line, the signal before 1 line is automatically selected as the result and is transferred to the selection unit 904.

Based on the control of the control unit 117, the selection unit 904 selects one of the differential signals from the buffer 903 in accordance with the result of the comparison unit 402, and transfers this to the noise reduction unit 604

It is noted that if the frame interval is short enough, the signal before 1 frame and the signal before 1 field may be replaced with the signal before several frames and the signal before several fields.

Now, the advantageous effects of the above-described noise reduction processing will be described.

Since the first noise amount presumed from the present image signal does not contain a motion component, by using this to separate the motion component and the random noise, both components can be separated in high accuracy to obtain a high quality image signal. Moreover, since the presumption of the first noise amount used for the separation uses a look up table, only a small computation is needed, and therefore it is possible to make the whole system high speed.

Moreover, since the above presumption of the first noise amount is dynamically adapted for different conditions in each shooting, it is possible to presume in high accuracy and stably. The method which selects an optimal second noise amount based on the first noise amount is easy, and therefore, it is possible to simplify the control and to improve the operativity.

Moreover, the noise reduction processing is performed by using the coring processing based on the low frequency component of the local area which includes the pixel of interest and the second noise amount, and therefore, it is possible to reduce only the random noise preponderantly, and to have the continuity with pixels other than noise, such as edges, to obtain a high quality image signal.

In the case where the average is used as the above-described low frequency component, it is possible to increase the speed and to reduce the cost in the whole system. Moreover, in the case where the processing result of the low pass filter is used, it is possible to extract the low frequency component stabilized without being influenced by the noise amount, and to perform highly precise noise reduction processing. In the case where the processing result of a bilateral filter is used, it is possible to extract the low frequency component stabilized without being influenced by the existence of a noise amount or the edge component, and to perform highly precise noise reduction processing.

Since the image signal which underwent the noise reduction processing is delayed for a line unit time, a field unit time, or a frame unit time, the affinity and the compatibility with the imaging devices and signal processing systems which are conventionally used are high, and therefore, it is possible to adapt to various imaging systems.

Moreover, since the luminance signal and the color difference signal are processed independently, it is possible to perform the separation of the motion component and the random noise in high precision, and to obtain a high quality image signal. Moreover, the color difference line sequential complementary color filter has high affinity with the present imaging systems, and therefore, it is possible to combine with various systems.

It is noted that although the color difference line sequential complementary color filter is used as the imaging device in the above-described embodiment, it is not necessary to be limited to such an arrangement. For example, a Bayer type primary color filter may be used as in the first embodiment. In this case, the missing RGB signal is compensated with known interpolation processing to obtain the luminance signal and the color difference signal based on Expression (19).

$$Y=0.29900R+0.58700G+0.11400B$$

$$Cb=-0.16874R-0.33126G+0.50000B$$

$$Cr=0.50000R-0.41869G-0.08131B \quad (19)$$

Moreover, in this case, there are only frame signals and there is no field signal. The second noise presumption unit 603 obtains the differential signal from the signal before 1 line or the signal before 1 frame, and selects one of those signals.

Furthermore, although the above-described embodiment is premised on the processing by hardware, it is not necessary to be limited to such an arrangement. For example, the image signal from the CCD 600 may be outputted as unprocessed Raw data, and accompanying information, etc., such as information on the color filter of the CCD 600 and the exposure information at the time of the shooting may be output as the header information from the control unit 117, and may be separately processed by software.

Figure 23A:
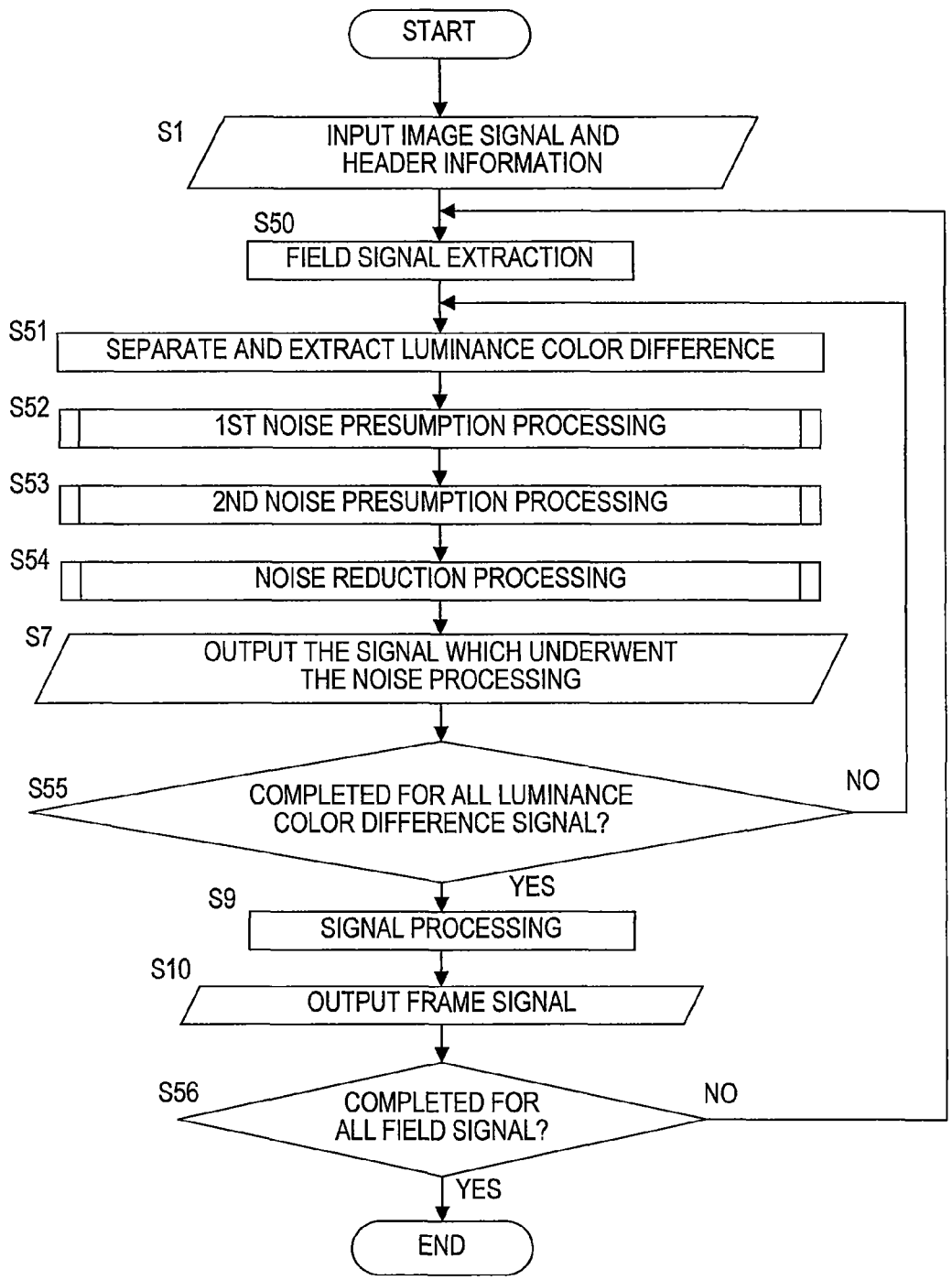
FIGS. 23A-23D are flow charts of the signal processing.

FIG. 23A shows a flow of the software processing in the case of making a computer to perform the above-described signal processing. It is noted that the same step number is assigned for the steps the same as the flow of the signal processing in the first embodiment shown in FIG. 12A. Hereafter, processing of each step will be described.

At Step S1, header information, such as information on the image signal and exposure information at the time of the shooting, are read.

At Step S50, the even number field signal and the odd number field signal are sequentially extracted from the image signal.

At Step S51, the luminance signal and the color difference signal are separated as shown in Expression (10). As shown in FIGS. 14B and 14C, the local area of 5×5 pixels in the case of the luminance signal, and 5×3 pixels in the case of the color difference signal are extracted from the luminance signal and the color difference signal after they are separated.

At Step S52, the first noise amount is presumed. This processing is performed according to the flow of FIG. 23B, which will be described later.

At Step S53, the second noise amount is presumed. This processing is performed according to the flow of FIG. 23C, which will be described later.

At Step S54, the noise reduction processing is performed. This processing is performed according to the flow of FIG. 23D, which will be described later.

At Step S7, the signal which underwent the noise reduction processing is outputted.

At Step S55, it determines whether the processing from Step S51 to Step S7 is completed for the local area for all of the luminance signals and color difference signals or not. If it is not completed, the process branches to Step S51, and if it is completed, the process branches to Step S9.

At Step S9, a frame signal is combined by known simultaneous processing from the even number field signal and the odd number field signal, and known emphasis processing, tone processing, and compression processing are performed to the frame signal.

At Step S10, the frame signal after the completion of the processing is outputted.

At Step S56, it determines whether the processing from Step S50 to S10 is completed for all of the field signals. If it is not completed, the process branches to Step S50, and if it is completed, the process ends.

Figure 23B:
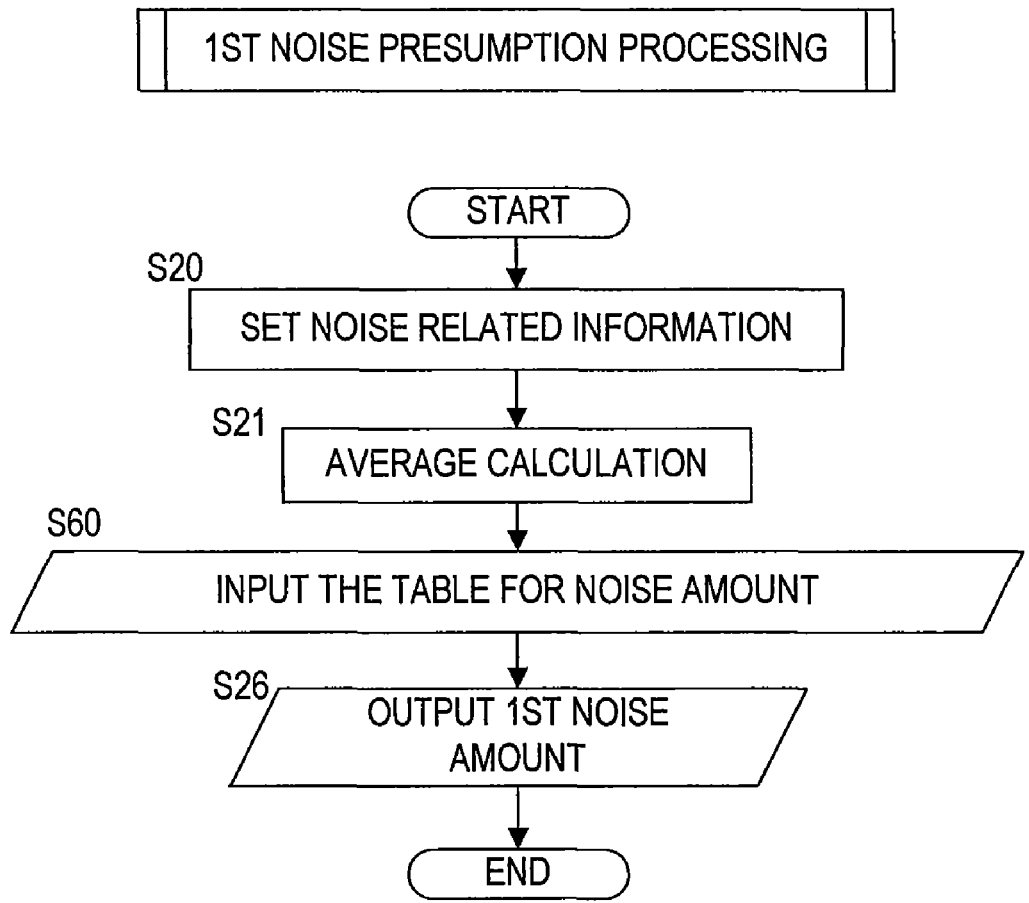

FIG. 23B is a flow of the first noise presumption processing at Step S52 in FIG. 23A. It is noted that the same step number is assigned for the step same with the flow of the first noise presumption processing in the first embodiment shown in FIG. 12B. Hereafter, processing of each step will be described.

At Step S20, information, such as temperature and gain, is set based on the read header information. If there are no required parameters in the header information, a predetermined standard value is assigned.

At Step S21, as shown in Expression (11), the average of the local area is calculated.

At Step S60, the table for the noise amount in which the relation among the signal value level of the luminance signal or the color difference signal, the gain, the operating temperature of the imaging device and the noise amount is recorded is read to obtain the first noise amount.

At Step S26, the first noise amount is outputted and the process ends.

Figure 23C:
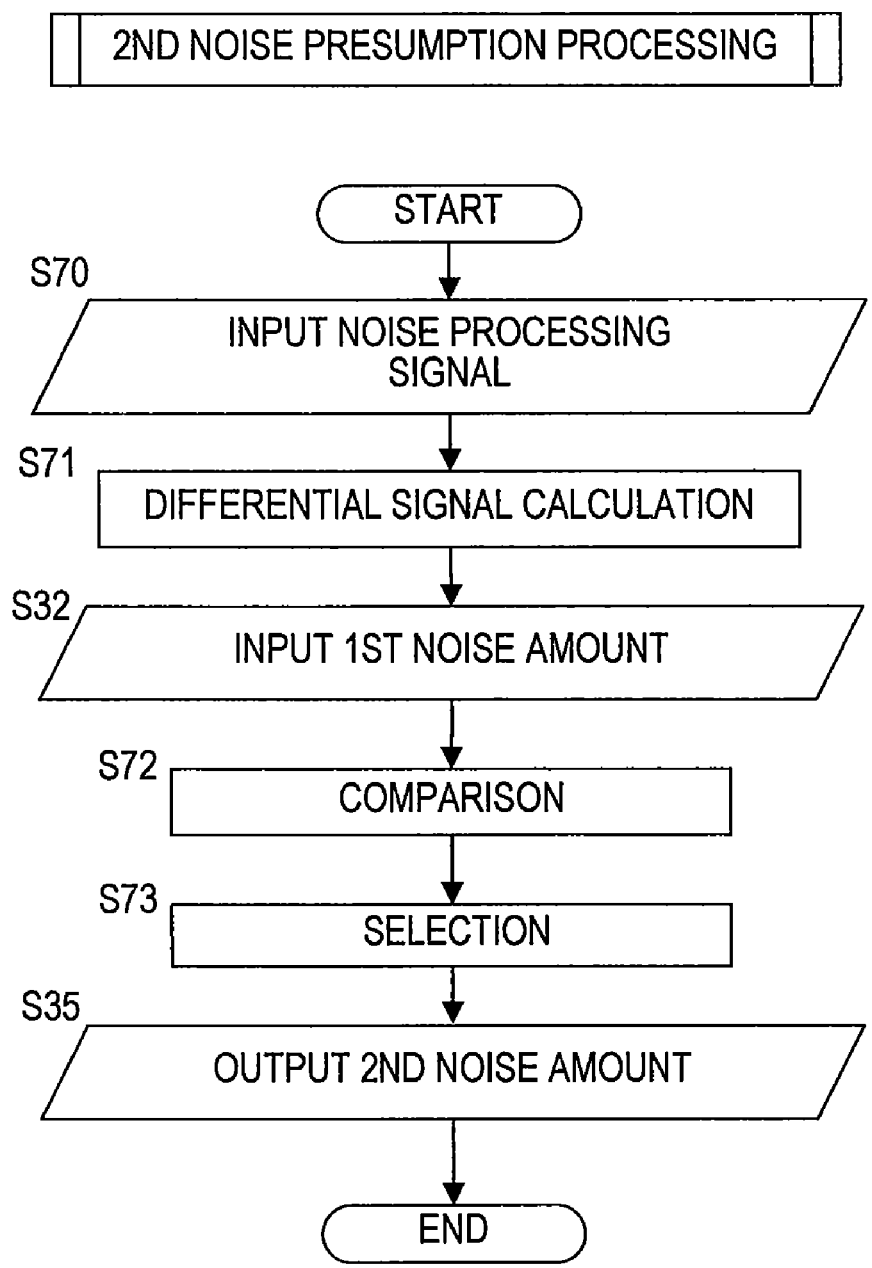

FIG. 23C is a flow of the second noise presumption processing at Step S53 of FIG. 23A. It is noted that the same step number is assigned with the same step as the flow of the second noise presumption processing in the first embodiment shown in FIG. 12C. Hereafter, processing of each step will be described.

At Step S70, the signal before 1 line, the signal before 1 field, and the signal before 1 frame of the past which underwent the noise reduction processing are inputted.

At Step S71, the differential signal is calculated as shown in Expressions (17) and (18).

At Step S32, the first noise amount is inputted.

At Step S72, the differential signal and the first noise amount are compared in the order of, the signal before 1 frame, the signal before 1 field, followed by the signal before 1 line. As to the above comparison, it fixes the result when the differential signal becomes less than or equal to the first noise amount, and if the differential signal before 1 line does not go less than the first noise amount, it uses the differential signal before 1 line as the comparison result.

At Step S73, the differential signal is selected based on the comparison result to assume the amount as the second noise amount.

At Step S35, the second noise amount is outputted and the process ends.

Figure 23D:
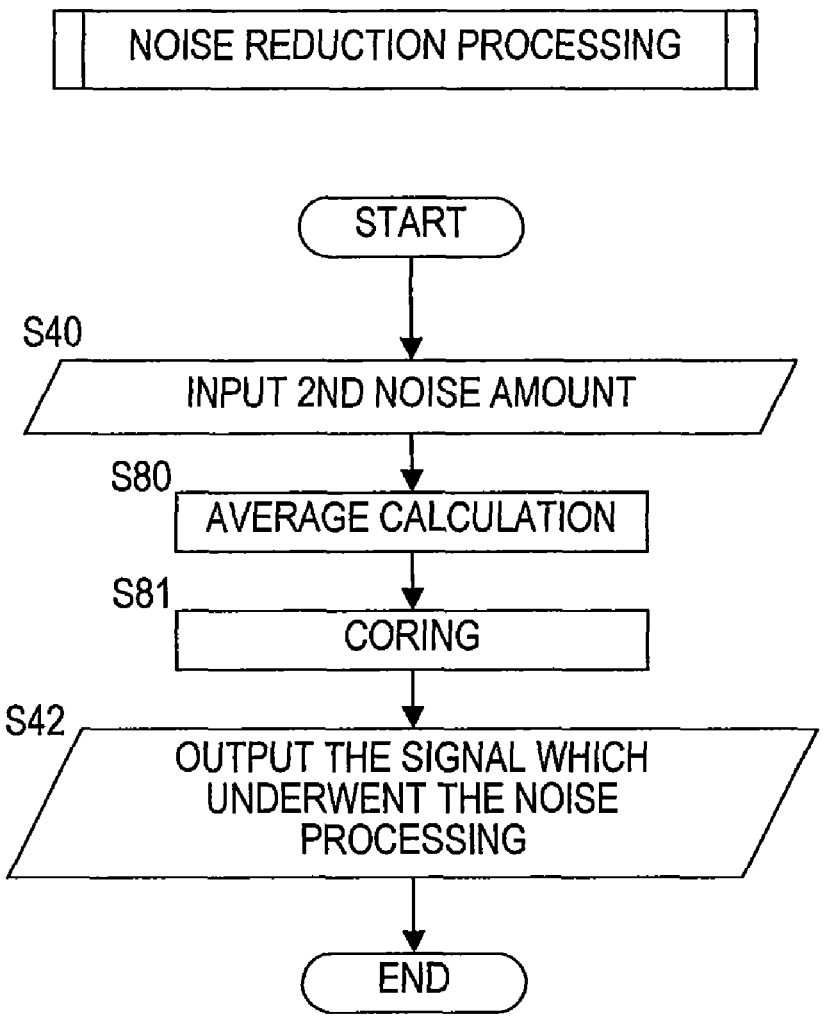

FIG. 23D is a flow of the noise reduction processing at Step S54 of FIG. 23A. It is noted that the same step number is assigned with the same step as the flow of the noise reduction processing in the first embodiment shown in FIG. 12D. Hereafter, processing of each step will be described.

At Step S40, the second noise amount is inputted.

At Step S80, the average of the local area is calculated as shown in Expression (11).

At Step S81, the coring processing is performed as shown in Expression (12) to obtain the signal which underwent the noise reduction processing.

At Step S42, the signal which underwent the noise reduction processing is outputted, and the process ends.

Thus, the signal processing may be done by software, and the same functions and advantageous effects can be achieved with the case where the processing is done by hardware.

The embodiments of the present invention were described in the above. However, the above embodiments only show examples of applications of the present invention and are not the meant to limit the technical scope of the present invention to specific arrangements of the above embodiments.

What is claimed is:

1. An image processing apparatus which performs noise reduction processing to image signals taken in from an imaging system in time sequence, comprising:
   a noise reduction unit which performs noise reduction processing to image signals;
   a first noise presumption unit which presumes a first noise amount from a present image signal among the image signals; and
   a second noise presumption unit which presumes a second noise amount based on the first noise amount, the present image signal, and the image signal of the past which underwent the noise reduction processing; and wherein
   the noise reduction unit performs the noise reduction processing to the present image signal based on the second noise amount.

2. The image processing apparatus according to claim 1, wherein
   the second noise presumption unit presumes the second noise amount by correcting a differential signal between the present image signal and the image signal of the past which underwent the noise reduction processing using the first noise amount.

3. The image processing apparatus according to claim 2, wherein
   the second noise presumption unit is comprised of:
   a delay unit which delays the image signal which underwent the noise reduction processing by a predetermined unit time;
   a differential unit which calculates a differential signal between the image signal and the delayed image signal which underwent the noise reduction processing;
   a comparison unit which compares between the differential signal and the first noise amount; and
   a correction unit which obtains the second noise amount by correcting the differential signal based on the comparison result.

4. The image processing apparatus according to claim 2, wherein
   the second noise presumption unit is comprised of:
   a delay unit which delays the image signal which underwent the noise reduction processing by a plurality of types of predetermined unit time;
   a differential unit which calculates a plurality of differential signals from between the image signal, and the delayed plurality of image signal which underwent the noise reduction processing;
   a comparison unit which compares between the plurality of differential signals and the first noise amount; and
   a selection unit which obtains the second noise amount by selecting one of the plurality of differential signals based on the comparison result.

5. The image processing apparatus according to claim 3, wherein
   the delay unit selects at least one among the group of a line unit time, a field unit time, and a frame unit time, as the predetermined unit time.

6. The image processing apparatus according to claim 3, wherein
   the delay unit is comprised of a recording unit which records the image signal which underwent the noise reduction processing.

7. The image processing apparatus according to claim 3, wherein
   the correction unit is comprised of an upper limit setting unit which sets an upper unit to the differential signal if an absolute value of the differential signal is greater than or equal to the first noise amount.

8. The image processing apparatus according to claim 3, wherein
   the correction unit is comprised of a replacement unit which replaces the differential signal to zero if an absolute value of the differential signal is greater than or equal to the first noise amount.

9. The image processing apparatus according to claim 1, wherein
   the noise reduction unit is comprised of:
   a pixel extraction unit which extracts a pixel of interest to perform the noise reduction processing from the present image signal;
   a noise amount extraction unit which extracts the second noise amount corresponding to the pixel of interest; and
   a subtraction unit which performs subtraction processing between a value of the pixel of interest, and the second noise amount corresponding to the pixel of interest.

10. The image processing apparatus according to claim 1, wherein
    the noise reduction unit is comprised of:
    a local area extraction unit which extracts a local area comprised of a pixel of interest and at least one proximate pixel located in proximity to the pixel of interest for performing noise reduction processing from the present image signal;
    a low frequency extraction unit which extracts a low frequency component from the local area;
    a noise amount extraction unit which extracts the second noise amount corresponding to the pixel of interest; and
    a coring unit which performs coring processing to the value of the pixel of interest based on the second noise amount and the low frequency component corresponding to the pixel of interest.

11. The image processing apparatus according to claim 10, wherein
    the low frequency extraction unit is comprised of an average calculation unit which calculates an average from the local area.

12. The image processing apparatus according to claim 10, wherein
the low frequency extraction unit is comprised of a low pass filter unit which applies a low pass filter to the local area.

13. The image processing apparatus according to claim 10, wherein
the low frequency extraction unit is comprised of a bilateral filter unit which applies a bilateral filter to the local area.

14. The image processing apparatus according to claim 1, wherein
the first noise presumption unit presumes the first noise amount from the present image signal using a noise model.

15. The image processing apparatus according to claim 14, wherein
the first noise presumption unit is comprised of:
a local area extraction unit which extracts a local area comprised of a pixel of interest and at least one proximate pixel located in proximity to the pixel of interest for performing the noise reduction processing from the present image signal;
an average calculation unit which calculates an average of the local area;
a collection unit which collects information on a temperature value of the imaging system and gain to the present image signal;
a parameter recording unit which records a group of parameters of a reference noise model;
a parameter selection unit which selects a parameter which is needed, from the group of parameters based on the information from the collection unit and the average of the local area; and
an interpolation unit which obtains a noise amount of the pixel of interest by an interpolation operation based on the average of the local area and the selected parameter.

16. The image processing apparatus according to claim 15, further comprising
a providing unit which provides a standard value for information which is not obtained in the collection unit, and wherein
the parameter selection unit selects the parameter which is needed, from the group of parameters based on the information from the collection unit and/or the providing unit, and the average of the local area.

17. The image processing apparatus according to claim 1, wherein
the first noise presumption unit is comprised of:
a local area extraction unit which extracts a local area comprised of a pixel of interest and at least one proximate pixel located in proximity to the pixel of interest for performing the noise reduction processing from the present image signal;
an average calculation unit which calculates an average of the local area;
a collection unit which collects information on a temperature value of the imaging system and gain to the present image signal; and
a noise table unit which outputs the noise amount of the pixel of interest by using the information from the collection unit and the average of the local area as an input.

18. The image processing apparatus according to claim 17, further comprising
a providing unit which provides a standard value for information which is not obtained in the collection unit, and wherein
the noise table unit outputs the noise amount of the pixel of interest by using the information from the collection unit and/or the providing unit, and the average of the local area as an input.

19. The image processing apparatus according to claim 1, wherein
the imaging system is an imaging system which uses an imaging device in which color filters are arranged in front of the imaging device, and the image processing apparatus further comprising:
a color signal separation unit which separates the image signal into a plurality of color signals for color filters used for the imaging device; and
a signal control unit which controls the noise reduction unit, the first noise presumption unit, and the second noise presumption unit so as to apply these units sequentially for each color signal.

20. The image processing apparatus according to claim 1, wherein
the imaging system is an imaging system which uses an imaging device in which color filters are arranged in front of the imaging device, and the image processing apparatus further comprising:
a luminance color difference separation unit which separates a luminance signal and a color difference signal from the image signal; and
a signal control unit which controls the noise reduction unit, the first noise presumption unit, and the second noise presumption unit so as to apply these units sequentially for each luminance signal and each color difference signal.

21. The image processing apparatus according to claim 19, wherein
the imaging device is an imaging device which arranges either one of a Bayer type primary color filter and a color difference line sequential complementary color filter in front of the imaging device.

22. A non-transitory computer readable storage medium stores an image processing program that when executed by a computer performs noise reduction processing to an image signal taken in from an imaging system in time sequence, wherein the noise reduction processing performs the steps of:
a noise reduction step which performs noise reduction processing to the image signal;
a first noise presumption step which presumes a first noise amount from a present image signal among the image signals; and
a second noise presumption step which presumes a second noise amount based on the first noise amount, the present image signal, and the image signal of the past which underwent the noise reduction processing; and wherein
the noise reduction step performs the noise reduction processing to the present image signal based on the second noise amount.

23. An image processing method which performs noise reduction processing to an image signal taken in from an imaging system in time sequence, the method comprising:
a noise reduction step which performs noise reduction processing to the image signal;
a first noise presumption step which presumes a first noise amount from a present image signal among the image signals; and
a second noise presumption step which presumes a second noise amount based on the first noise amount, the present image signal, and the image signal of the past which underwent the noise reduction processing; and wherein
the noise reduction step performs the noise reduction processing to the present image signal based on the second noise amount.

* * * * *